(12) United States Patent
Yoshiasa

(10) Patent No.: US 6,976,057 B2
(45) Date of Patent: Dec. 13, 2005

(54) CONTENT ACQUIRING DEVICE, METHOD, AND SYSTEM USING VALID TERMS TO KEEP A CACHE UP-TO-DATE

(75) Inventor: Masahiro Yoshiasa, Kanagawa (JP)

(73) Assignee: NEC Corporation, Tokyo (JP)

( * ) Notice: Subject to any disclaimer, the term of this patent is extended or adjusted under 35 U.S.C. 154(b) by 808 days.

(21) Appl. No.: 09/749,186

(22) Filed: Dec. 27, 2000

(65) Prior Publication Data

US 2001/0025305 A1 Sep. 27, 2001

(30) Foreign Application Priority Data

Dec. 27, 1999 (JP) .......................... 11-370881

(51) Int. Cl.$^7$ .................. G06F 15/167; G06F 15/16
(52) U.S. Cl. .................. 709/216; 709/203; 709/217
(58) Field of Search .................. 709/203, 216, 709/217, 219, 227; 707/200

(56) References Cited

U.S. PATENT DOCUMENTS

| | | | | |
|---|---|---|---|---|
| 5,873,100 A | * | 2/1999 | Adams et al. .............. | 707/204 |
| 5,931,904 A | * | 8/1999 | Banga et al. .............. | 709/217 |
| 6,038,601 A | * | 3/2000 | Lambert et al. .............. | 709/226 |
| 6,253,234 B1 | * | 6/2001 | Hunt et al. .................. | 709/216 |
| 6,618,751 B1 | * | 9/2003 | Challenger et al. ......... | 709/203 |

FOREIGN PATENT DOCUMENTS

| | | |
|---|---|---|
| JP | 10-51483 | 2/1998 |
| JP | 10-105448 | 4/1998 |
| JP | 10-105481 | 4/1998 |
| JP | 11-053244 | 2/1999 |
| JP | 2000-20373 | 1/2000 |

* cited by examiner

Primary Examiner—Hosain Alam
Assistant Examiner—David Lazaro
(74) Attorney, Agent, or Firm—Scully, Scott, Murphy & Presser

(57) ABSTRACT

To provide a content acquiring device, a content acquiring method, a content server and a content acquiring system which can minimize an acquisition request for content data and can acquire content data having a current version as much as possible. By using a validity term previously held by the content acquiring device or a validity term of the content added during content acquisition, it is previously decided in the device whether the content are to be updated or not, thereby transmitting an acquisition request to be an access to a content server for storing content data requested to be acquired through a network.

5 Claims, 18 Drawing Sheets

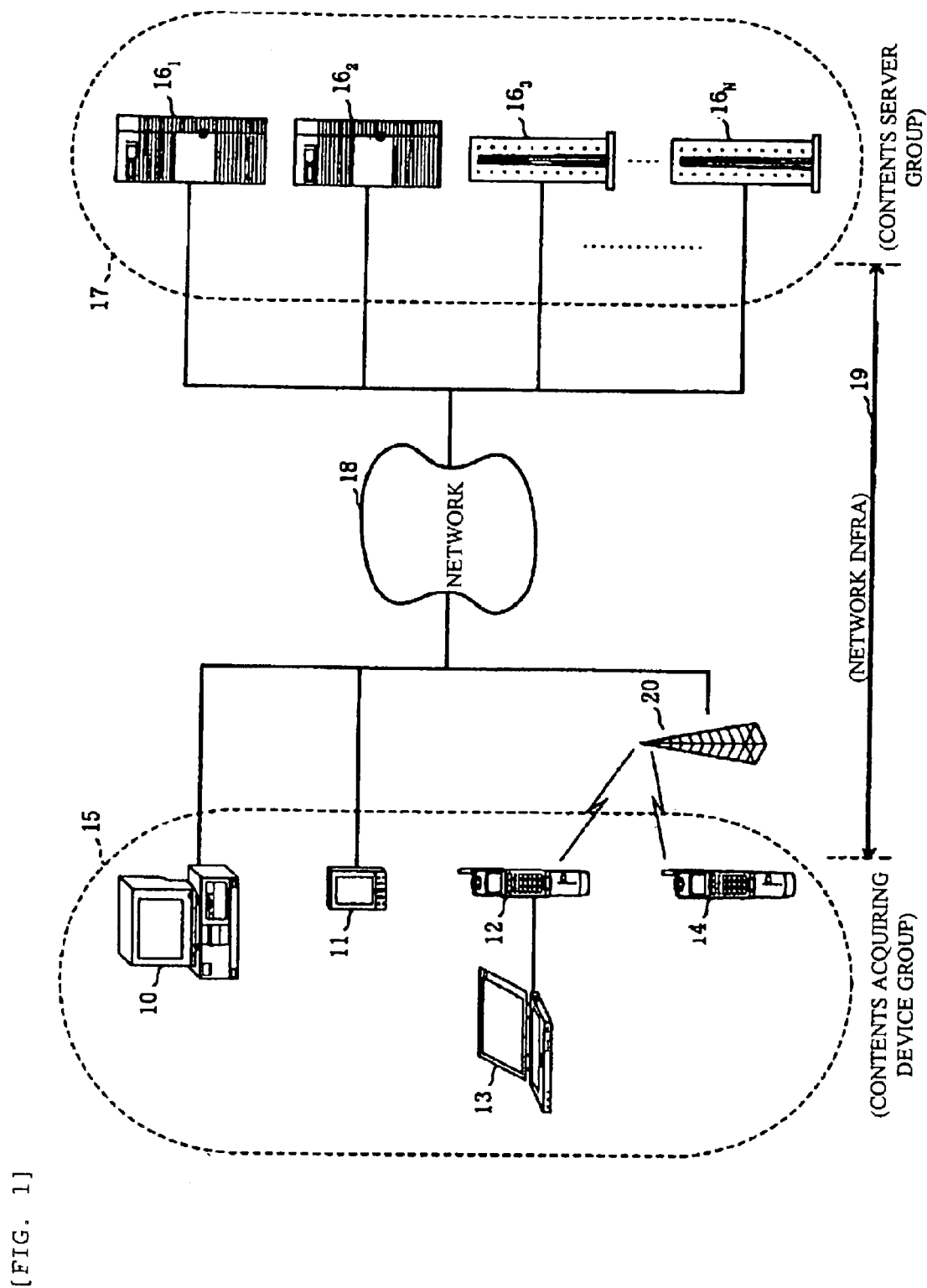
[FIG. 1]

[FIG. 3]
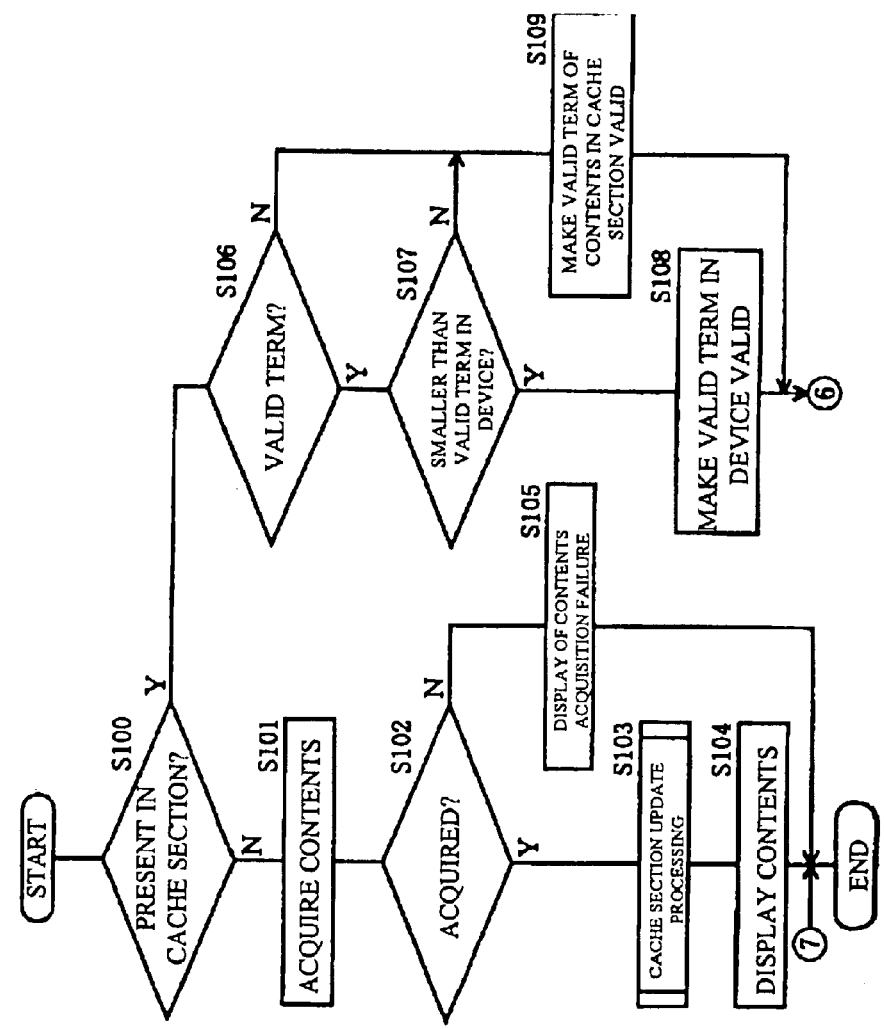
[FIG. 2]
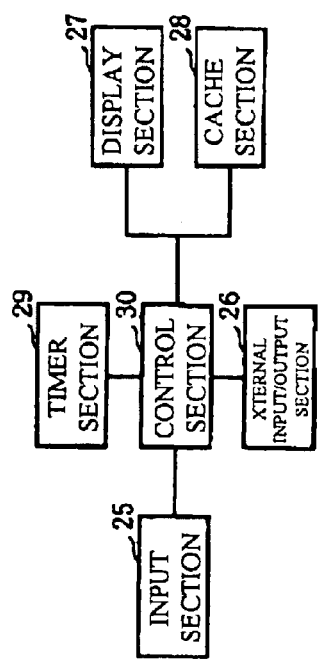

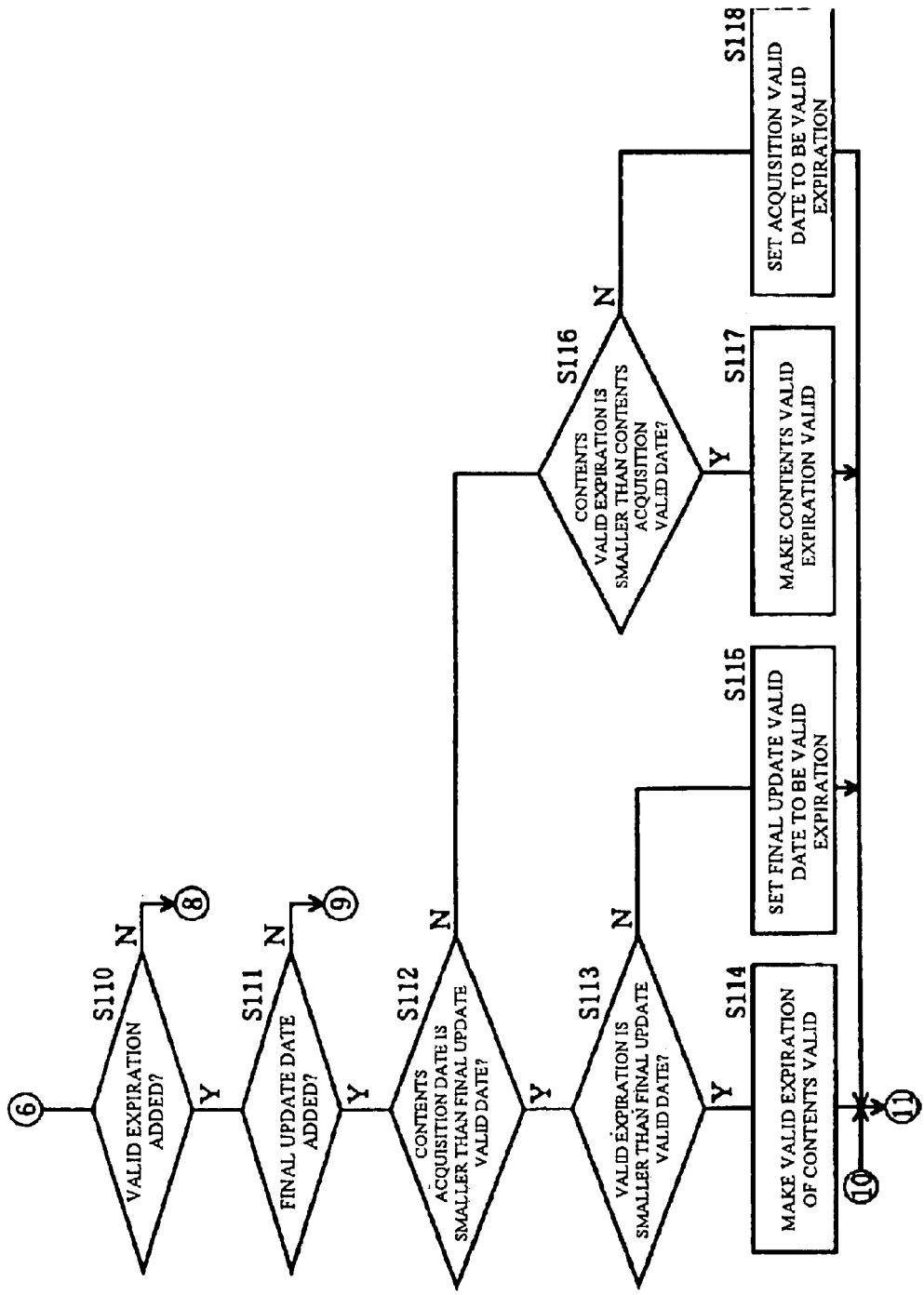
[FIG. 4]

[FIG. 5]
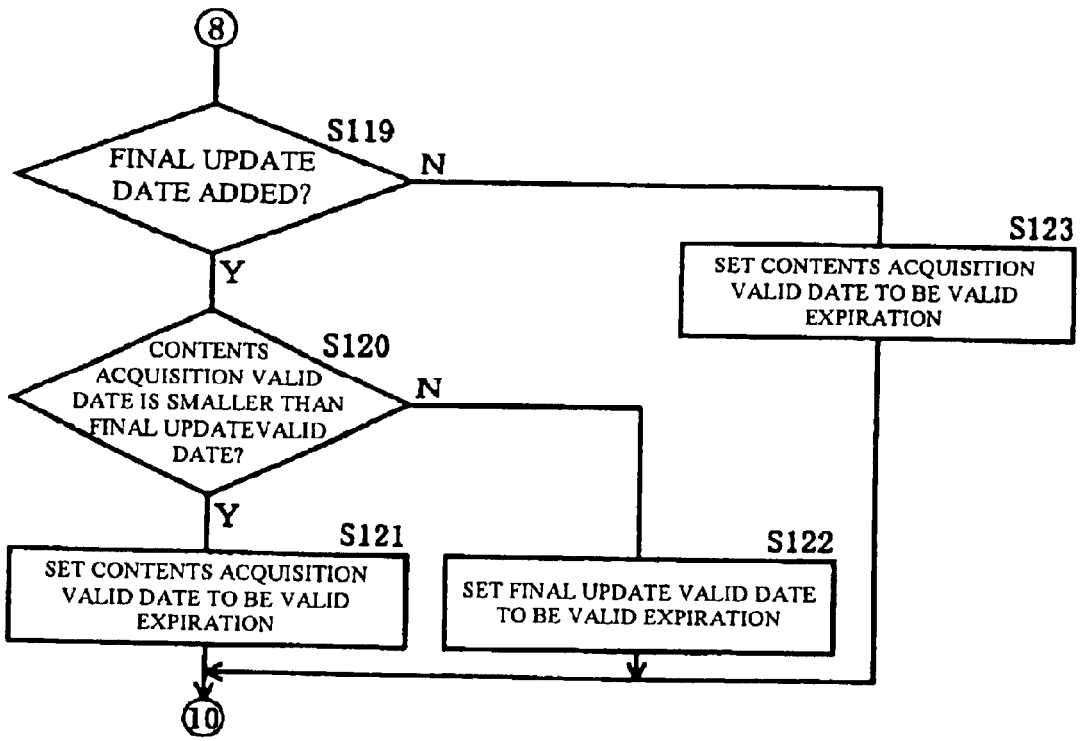
[FIG. 6]
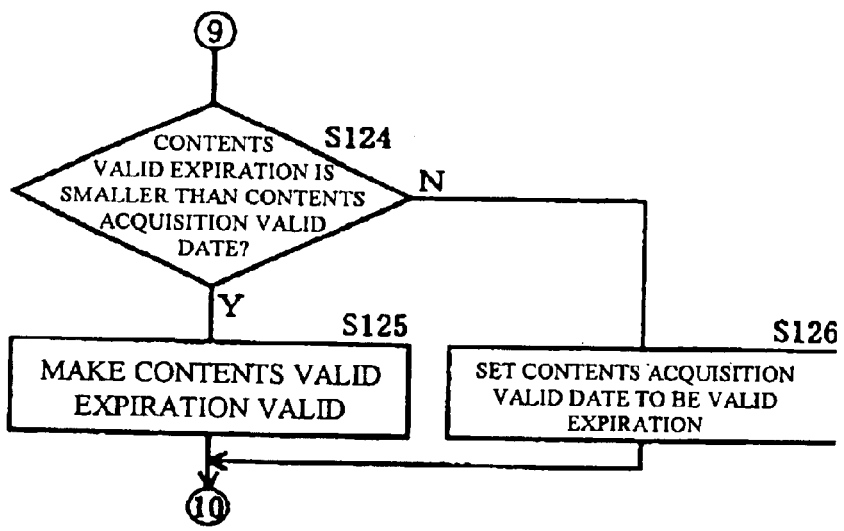

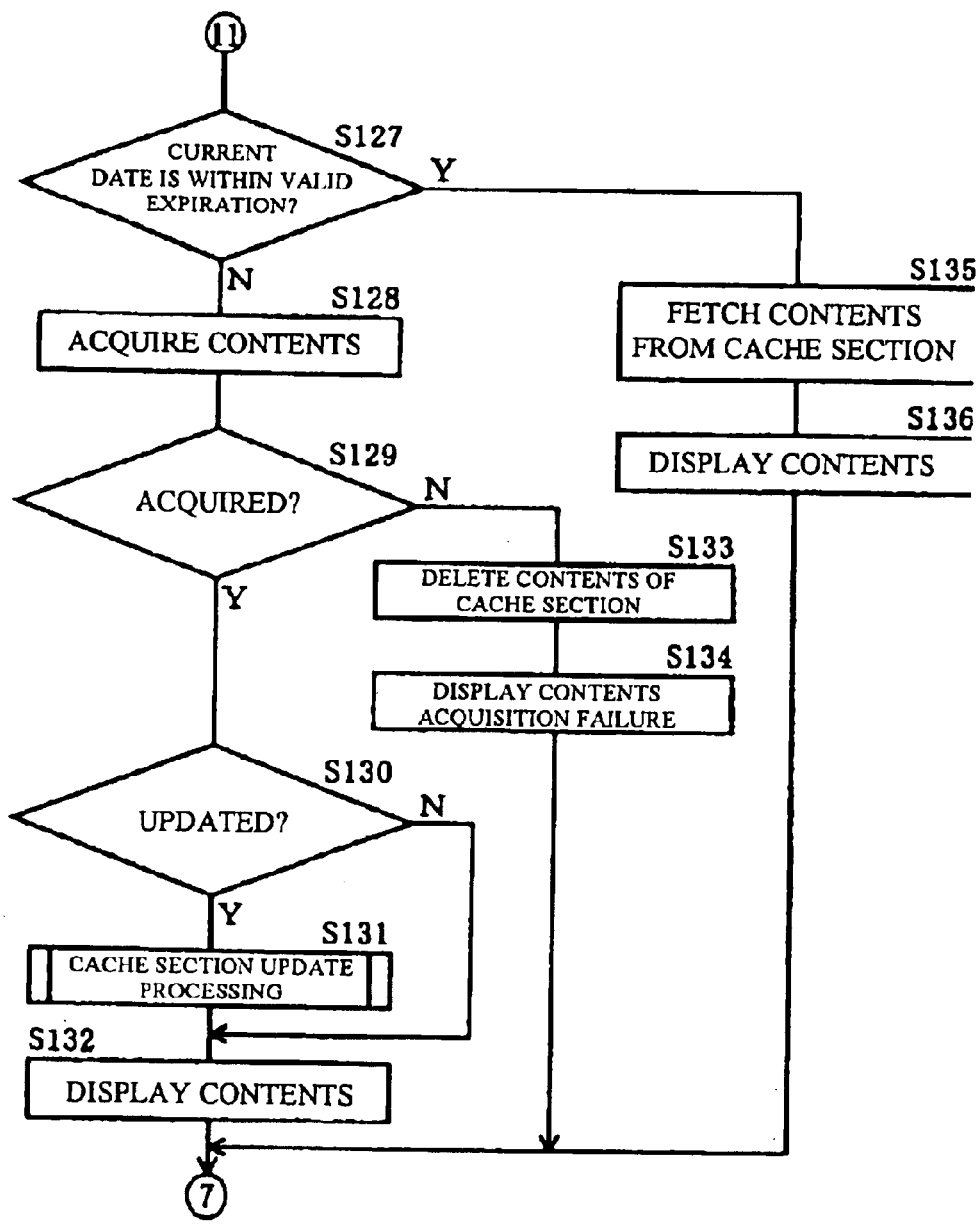

[FIG. 8]
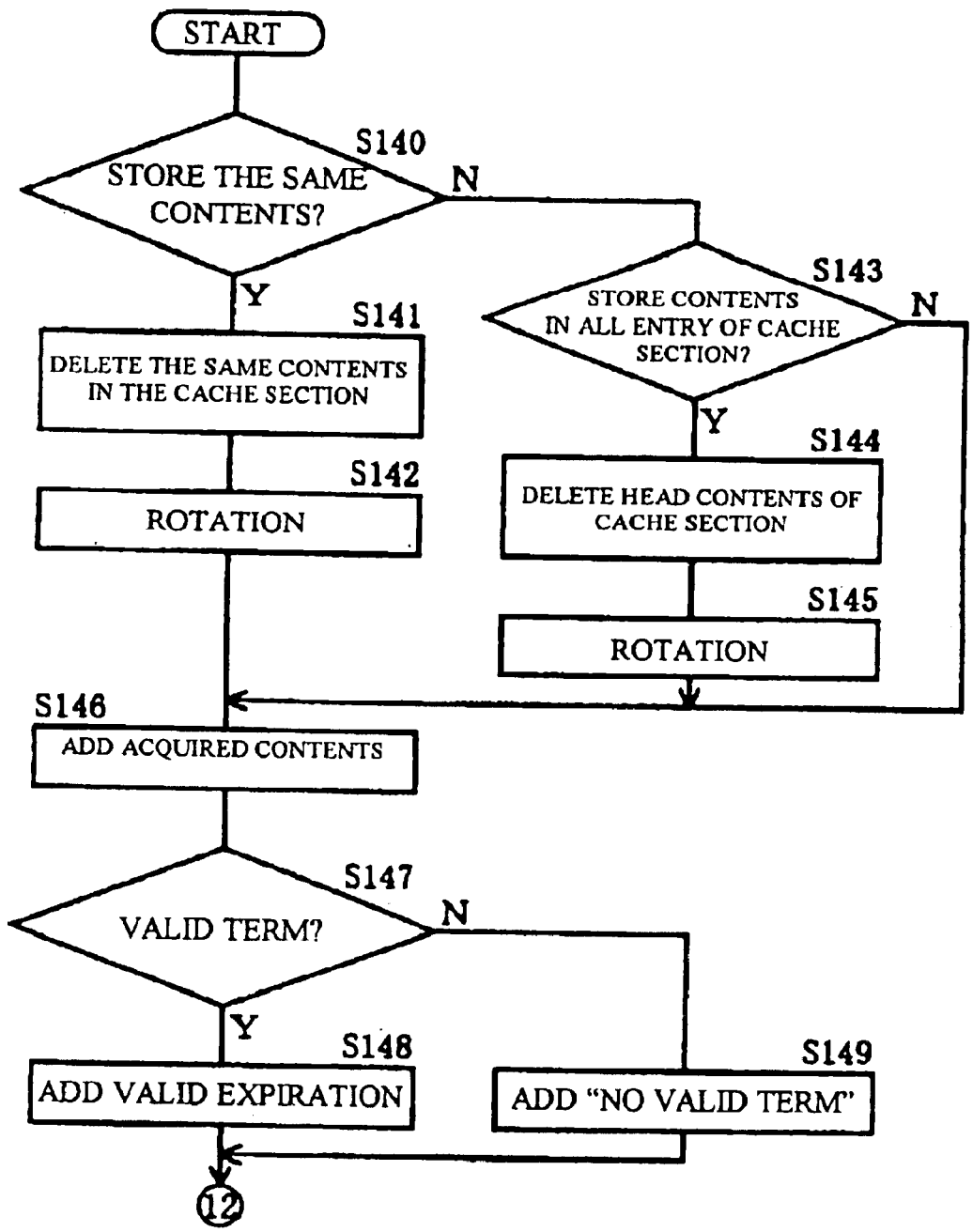

[FIG. 9]
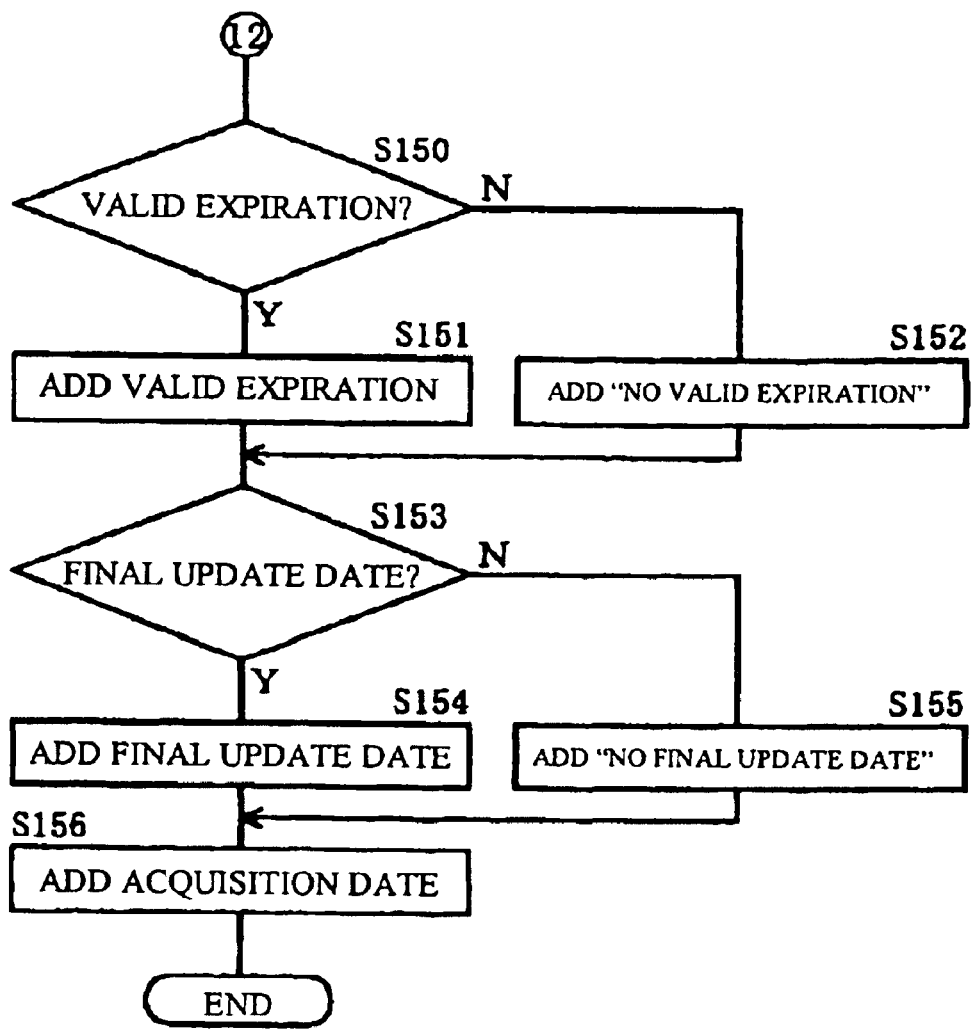

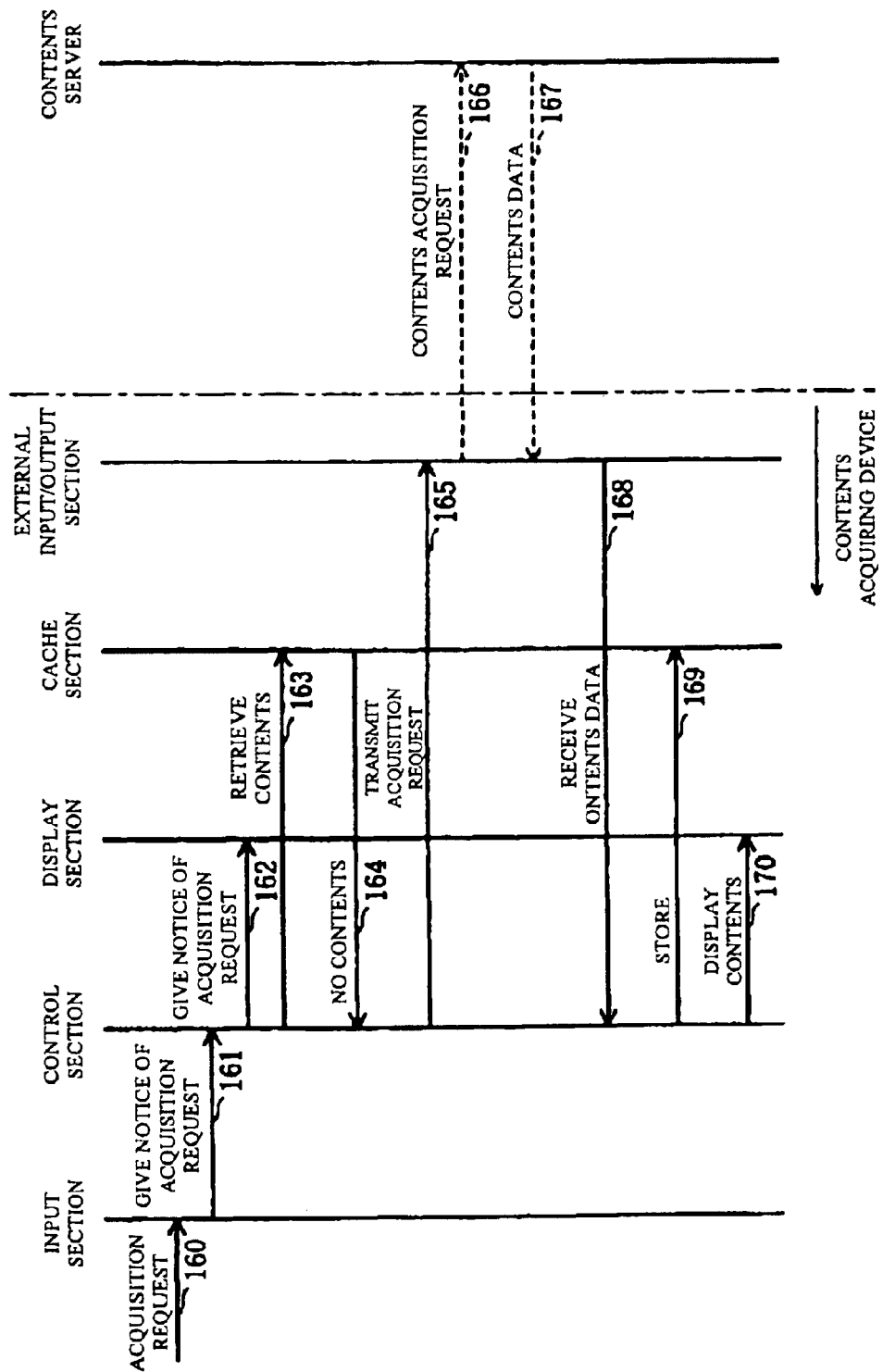
[FIG. 10]

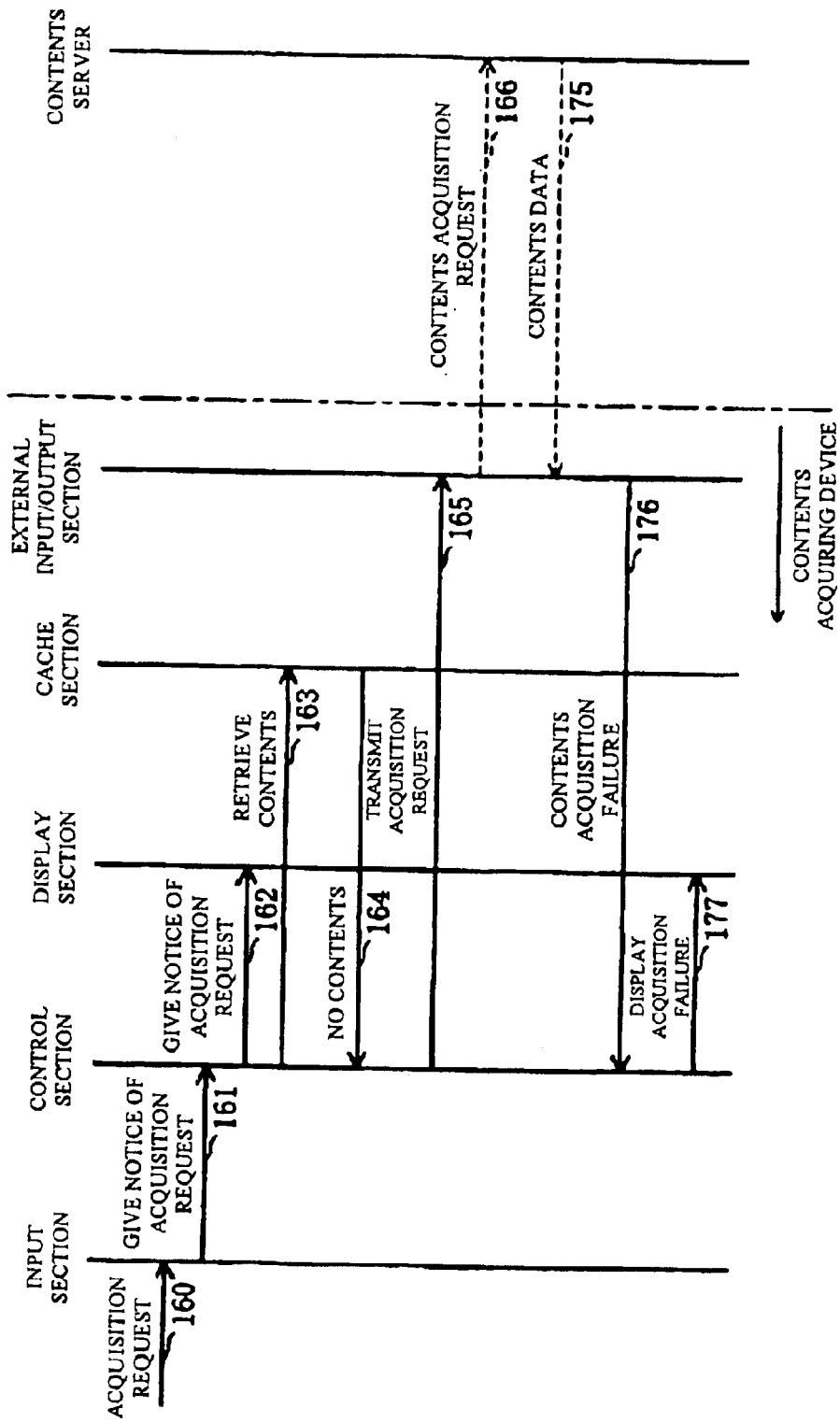

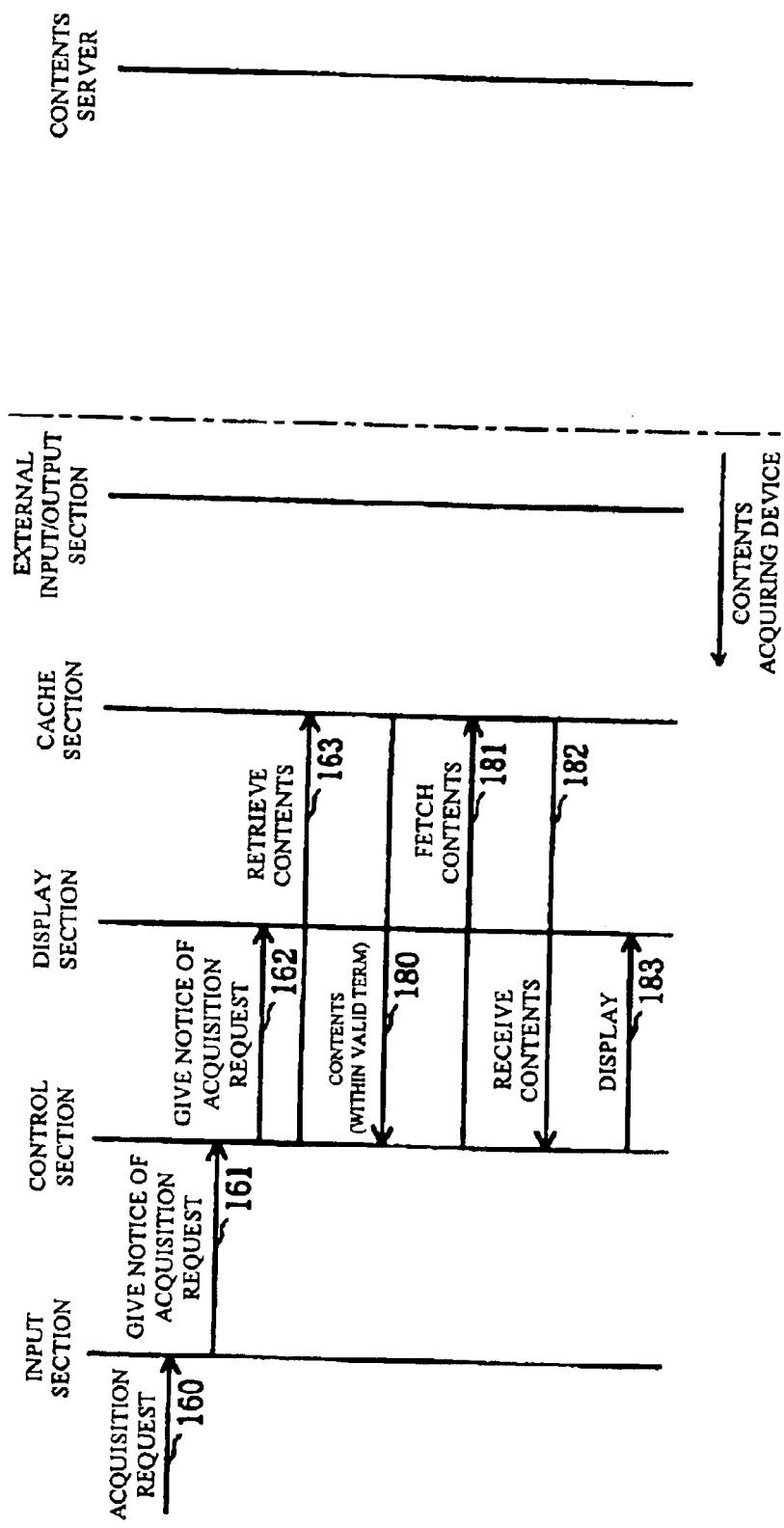
[FIG. 12]

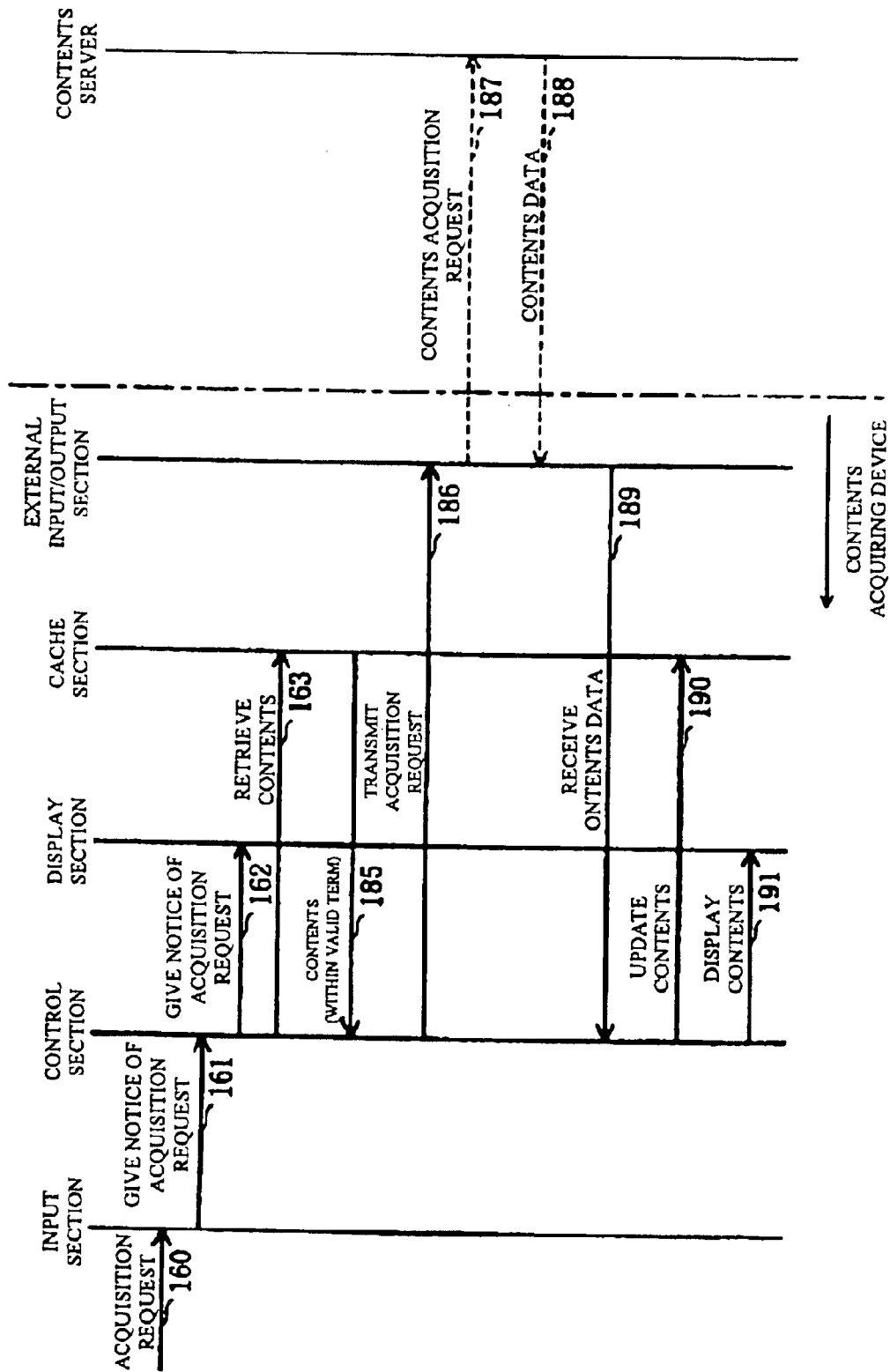
[FIG. 13]

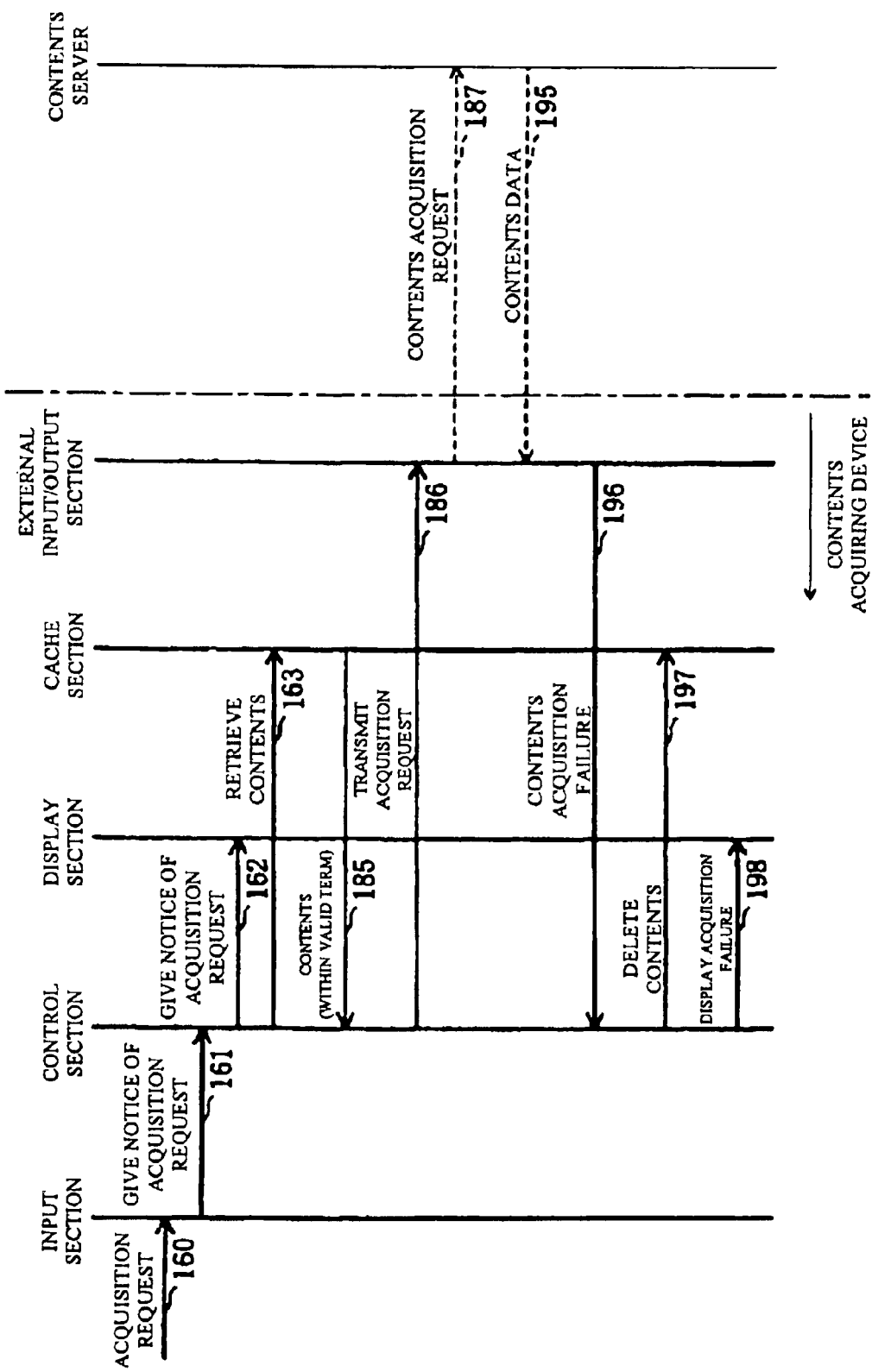
[FIG. 14]

[FIG. 15]
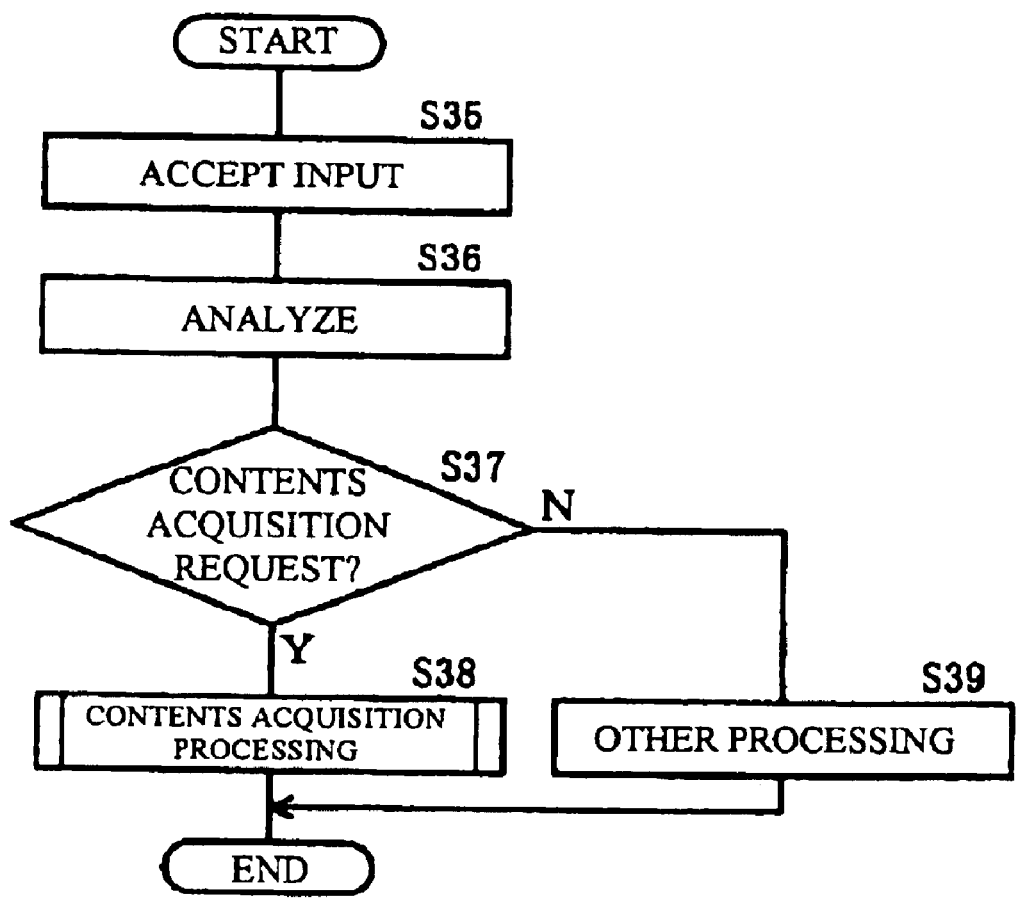

[FIG. 16]
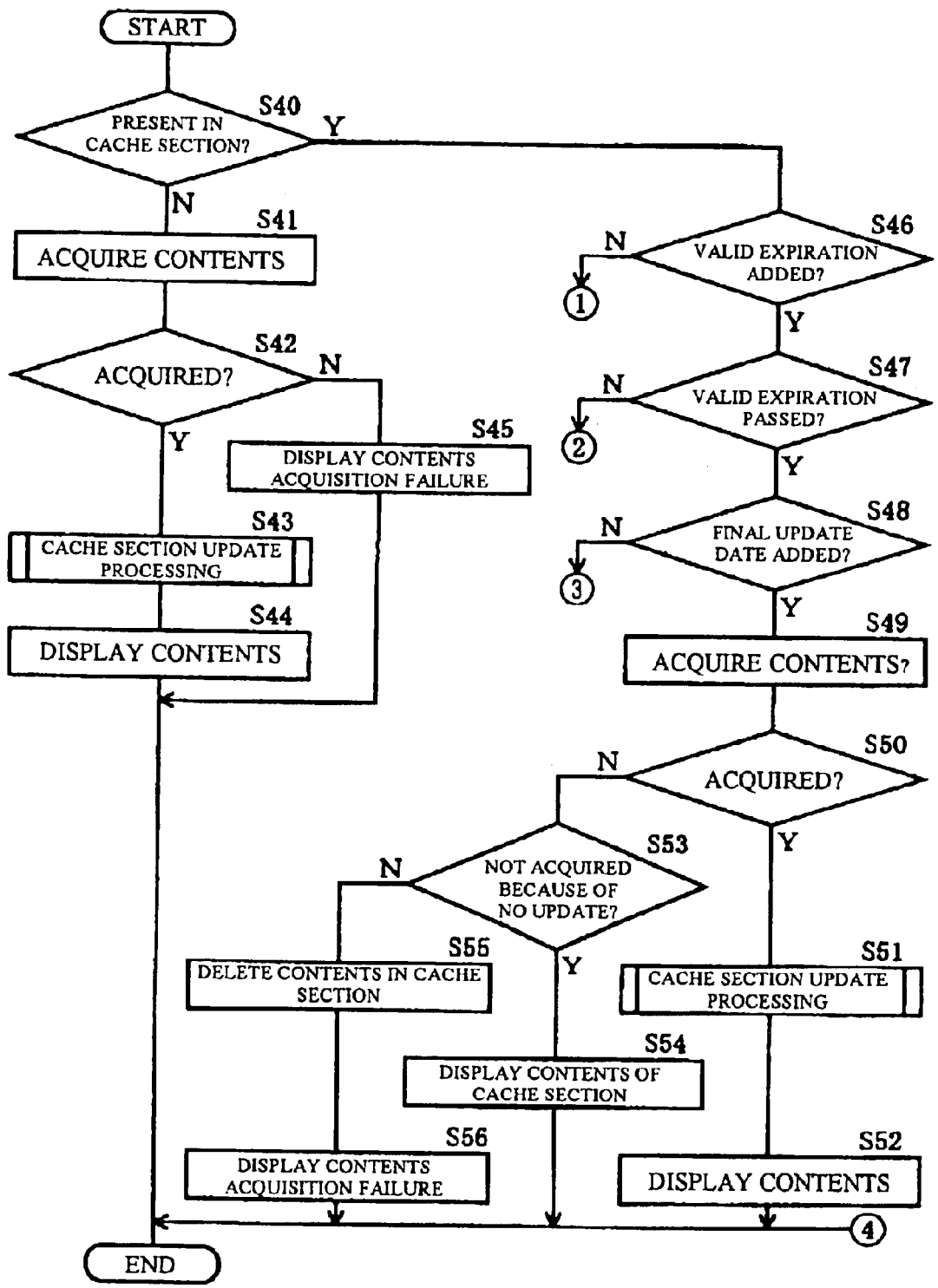

[FIG. 17]
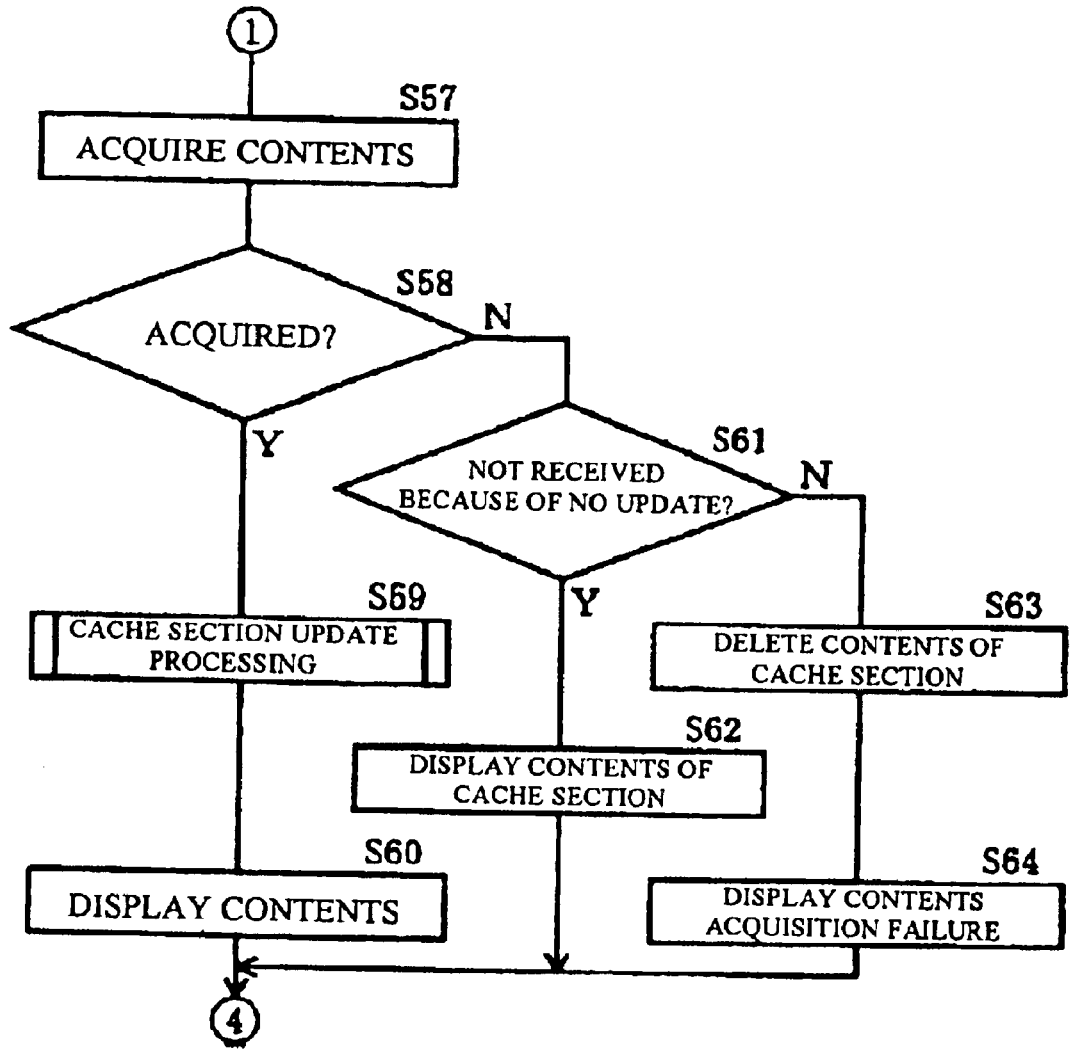
[FIG. 18]
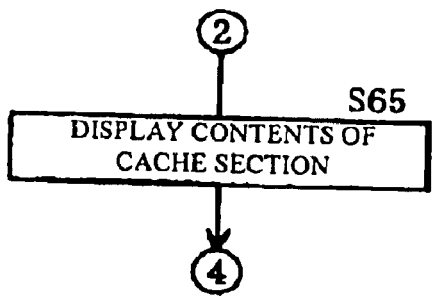

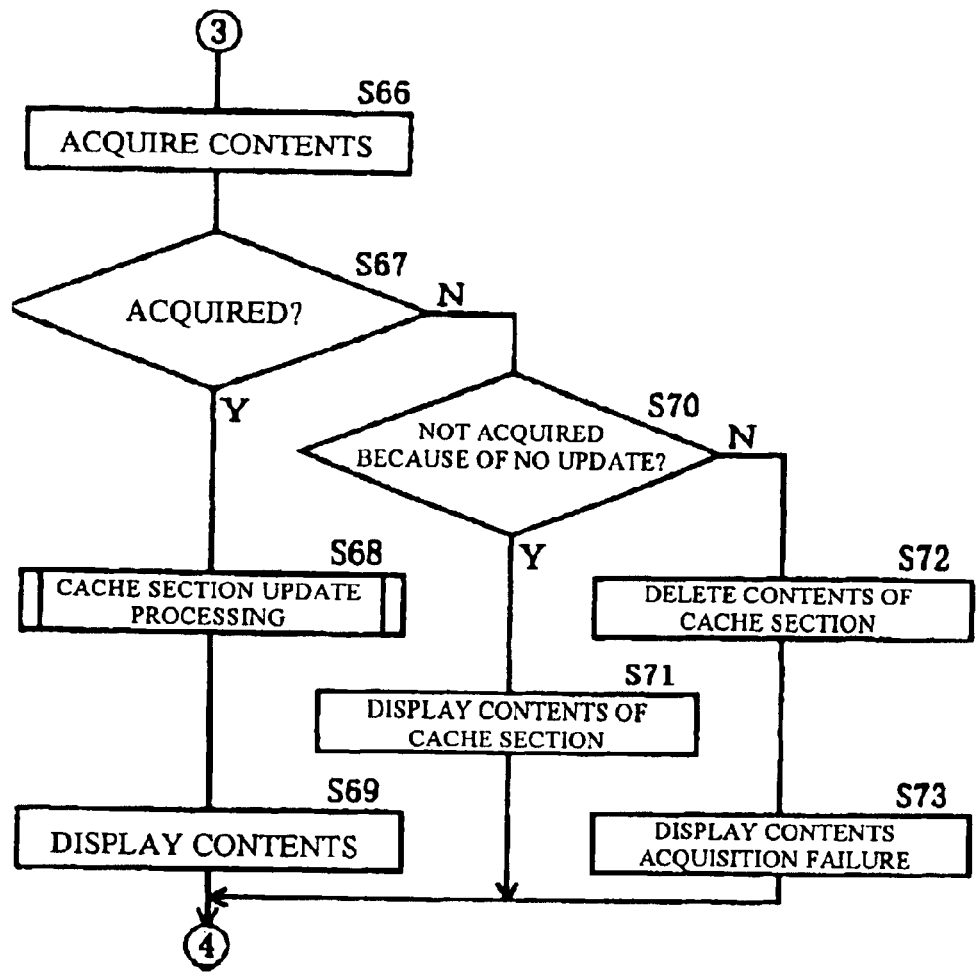
[FIG. 19]

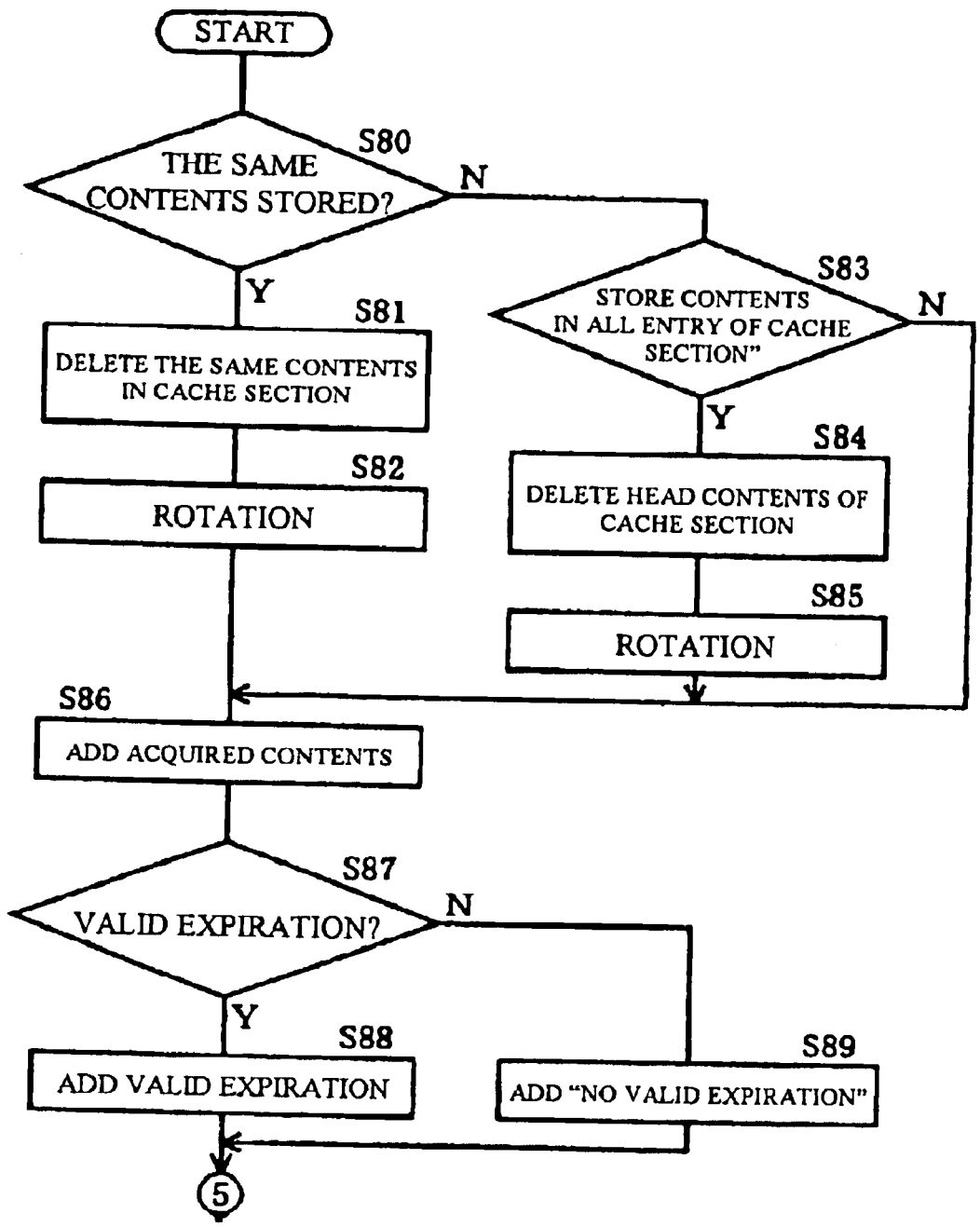
[FIG. 20]

[FIG. 21]
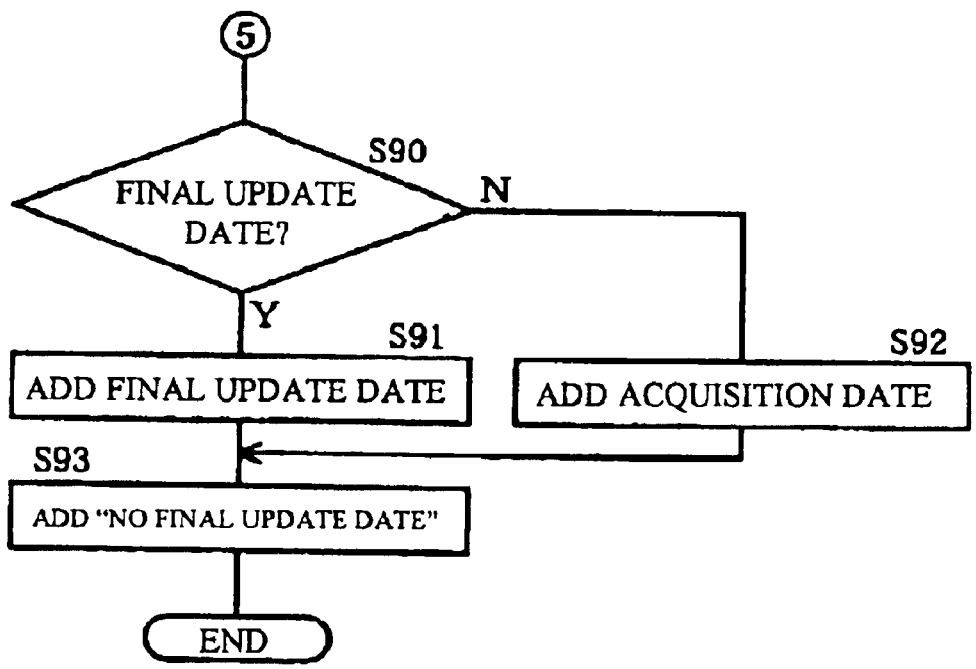

CONTENT ACQUIRING DEVICE, METHOD, AND SYSTEM USING VALID TERMS TO KEEP A CACHE UP-TO-DATE

BACKGROUND OF THE INVENTION

The present invention relates to a content acquiring device for acquiring content data stored in various content servers, a content acquiring method, a content server and a content acquiring system, and more particularly relates to a content acquiring device capable of acquiring content data stored in a cache section provided in the device in place of the content data stored in the content server.

In recent years, semiconductor technology, communication technology and the like have been developed. Therefore, it is possible to access a server on an internet through a leased line or a public telecommunication network, and to receive various types of content services by using a personal computer or a portable telephone in a home as a client. However, it takes time to access various content data through a communication line having a low data transfer speed in the public communication network or the like, and the number of internet users has been rapidly increasing so that throughput has been reduced. For this reason, it has been desirable that the capacity of a server for preparing and storing network content should be enhanced.

As a countermeasure to avoid such a situation, a cache is provided in a content acquiring device for acquiring various content data. Referring to content data that are not required to access a content server on the internet, data are fetched from the cache, thereby reducing data access through the network.

FIG. 1 shows the summary of the structure of a content acquiring system to which the content acquiring device for acquiring such content data is applied. The content acquiring system comprises a content acquiring device group 15 including a personal computer 10, a portable terminal for managing a game terminal or personal information (Personal Digital Assistants: hereinafter referred to as a PDA) 11, a laptop computer 13 having a mobile communication terminal 12 such as a personal handy phone system (hereinafter referred to as a PHS) or a portable telephone connected as a communication interface apparatus, a portable telephone 14 having a browser function and the like, and a content server group 17, including first to Nth content servers 16₁ to 16_N for storing various content data in a variety of fields connected through a network 18, including for example a public communication network or a leased line.

For example, in a browser, a content data reading program that is operated by the personal computer 10, a URL (Uniform Resource Locator) for specifying various information resources, such as the desirable content is specified, and desirable content is acquired from the content server corresponding to the specified URL through a network 19 having the network 18. Based on the browser function of the portable telephone 14, moreover, the content data are acquired from the content server corresponding to the specified URL through a radio base station 20 for carrying out radio communication with the mobile communication terminal 12 and the portable telephone 14 and the network 19 comprising the network 18.

Each content acquiring device in the content acquiring device group 15 includes the following sections.

FIG. 2 illustrates a summary of the structure of the content acquiring device. The content acquiring device comprises an input section 25 for accepting various requests sent from a device user, an external input/output section 26 having an interface function together with the network 19, a display section 27 for displaying content acquired by the external input/output section 26, a cache section 28 for temporarily storing the content data, a timer section 29 for timing an update time of the content data stored in the cache section 28, and a control section 30 for controlling each section of the device.

Since the content acquiring device has the cache function for the content data, the content once accessed, can be fetched and read without the network 19. The content data stored in the cache section 28 are properly updated based on access information such as a validity term or a final update date, which is added to the content data. Thus, to the extend possible, the newest content is provided to the user without the network 19.

The control section 30 of the content acquiring device carries out control functions by executing various processes in accordance with a control program stored in a memory that is not shown.

FIG. 15 shows a summary of processing for content acquisition and control executed by the control section of the conventional content acquiring device. When the control section 30 accepts the input of various device operation commands from the device user through the input section 25 (Step S35), it first analyzes the device operation commands thus accepted (Step S36). As a result of the analysis, when the device operation commands sent from the device user is a request for acquiring content (Step S37: Y), a predetermined content acquiring processing is carried out (Step S38) and a processing section is ended (End). Moreover, when the device operation command sent from the device user is not the request for acquiring the content (Step S37: N), processing corresponding to other various operation commands thus analyzed is carried out (Step S39) and a processing section is ended (End).

FIGS. 16 to 19 show a summary of processing content for the content acquiring processing of Step S38 in FIG. 15. The control section 30 further analyzes the request for content acquisition that is accepted by the input section 25 specifies the requested content data, and retrieves from the cache section 28 to decide whether or not there are present the requested content data (Step S40). When it is decided the content data requested to be acquired by the cache section 28 are not present (Step S40: N), an instruction for transmitting a request for acquiring the content data is given to the external input/output section 26 (Step S41). The external input/output section 26 transmits a content acquisition request in response to the instruction given from the control section 30, through the network 19 to the content server that stores the content data requested.

The external input/output section 26 monitors the normal receipt of the content data from the content server serving on a content request destination through the network 19, and transfers the received content to the control section 30 when detecting the normal receipt. When the control section 30 acquires the content data normally received by the external input/output section 26 (Step S42: Y), it updates the cache section 28 with the acquired content (Step S43) and gives an instruction for displaying the received content to the display section 27 (Step S44). The display section 27 displays the received content in response to the instruction given from the control section 30. Then, a processing section is ended (End).

On the other hand, when the external input/output section 26 cannot receive the content data from the content server that is the acquisition request destination through the network 19 and the control section 30 cannot acquire the content data (Step S42: N), the control section 30 deletes the content stored in the cache section 28 and gives the display section 27 an instruction to display content acquisition failure (Step S45). The display section 27 displays an indication of the content acquisition failure in response to the instruction sent from the control section 30. Then, a processing section is ended (END).

When it is decided that the cache section 28 has the content data required to be acquired at the Step S40 (Step S40: Y), the control section 30 decides whether or not a validity term is added to the content data requested to be acquired which are stored in the cache section 28 (Step S46). The validity term may be, for example added at the time of the acquisition from the content server. When the validity term is added to the content stored in the cache section 28 (Step S46: Y), it is decided whether or not a current date timed by the timer section 29 renders expired the validity term added to the content (Step S47). When it is decided that the current date timed by the timer section 29 renders expired the validity term added to the content (Step S47: Y), the control section 30 further decides whether or not a final update date is added when the content stored in the cache section 28 are acquired (Step S48). If it is decided that the final update date is to be added when the content is acquired (Step S48: Y), the control section 30 gives an instruction for transmitting a content acquisition request on condition that the update is carried out after the final update date to the external input/output section 26 (Step S49). The content acquisition request is valid only if in the content server the content has been updated after the final update date. The external input/output section 26 transmits such a content acquisition request in response to an instruction sent from the control section 30.

The external input/output section 26 monitors the normal receipt of the content data from the content server serving as the content request destination through the network 19, and transfers the received content data to the control section 30 when detecting the normal receipt. When the control section 30 acquires normally the content data normally received by the external input/output section 26 (Step S50: Y), it updates the cache section 28 by using the acquired content (Step S51) and gives an instruction for displaying the received content to the display section 27 (Step S52). The display section 27 displays the received content in response to the instruction given from the control section 30. Then, a processing section is ended (END).

On the other hand, when the external input/output section 26 cannot receive the content data from the content server serving as the acquisition request destination through the network 19 and the control section 30 cannot acquire the content data at Step S50 (Step S50: N), the reason why the content cannot be acquired is analyzed. For example, a response sent from the content server is analyzed.. For example, date as a result of the analysis carried out according to the response from the content server, when the reason why the content data cannot be acquired is that content on the content server side was updated after the final update for example, (Step S53: Y), the control section 30 fetches the content previously acquired by the cache section 28 and gives the display section 27 an instruction to display that content (Step S54). The display section 27 displays the content according to the instruction sent from the control section 30. Then, a processing section is ended (END).

When the content data cannot be acquired for another reason except that the content data at the content server side are not updated after the final update date as a result of the analysis carried out according to the response sent from the content server, for example, at the Step S53 (Step S53: N), the control section 30 deletes the content stored in the cache section 28 (Step S55) and gives an instruction for displaying content acquisition failure to the display section 27 (Step S56). The display section 27 displays the content acquisition failure in response to the instruction sent from the control section 30. Then, a processing section is ended (END).

When the validity term is not added to the content stored in the cache section 28 at Step S46 (Step S46: N), the control section 30 gives the external input/output section 26 an instruction for transmitting a content acquisition request on condition that the content stored in the cache section 28 is updated after the date that the content is acquired (Step S57). The content acquisition request is valid only when the content stored in the cache section 28 are updated after the date that the content are acquired in the content server. The external input/output section 26 transmits such a content acquisition request in response to the instruction sent from the control section 30.

The external input/output section 26 monitors the normal receipt of the content data from the content server serving as content request destination through the network 19, and transfers the received content data to the control section 30 when detecting the normal receipt. When the control section 30 normally acquires the content data received by the external input/output section 26 (Step S58: Y), it updates the cache section 28 by using the acquired content (Step S59) and gives an instruction for displaying the received content to the display section 27 (Step S60). The display section 27 displays the received content in response to the instruction given from the control section 30. Then, a processing section is ended (END).

On the other hand, when the external input/output section 26 cannot receive the content data from the content server through the network 19 and the control section 30 cannot acquire the content data at the Step S58 (Step S58: N), the reason why the content cannot be acquired is analyzes analyzed. For example, as a result of the analysis carried out a response sent from the content server is analyzed. For example, when the reason why the content data cannot be acquired is that the content at the content server side was not updated after the date that the content stored in the cache section 28 were acquired according to the response from the content server, for example, (Step S61: Y), the control section 30 fetches the content previously acquired by the cache section 28 and gives the display section 27 an instruction to display the content (Step S62). The display section 27 displays the content according to the instruction sent from the control section 30. Then, a processing section is ended (END).

When the content data cannot be acquired for another reason except that the content on the content server side are not updated after the date that the content stored in the cache section 28 are acquired as a result of the analysis carried out according to the response sent from the content server, for example, at the Step S53 (Step S61: N), the control section 30 deletes the content stored in the cache section 28 (Step S63) and gives an instruction for displaying content acquisition failure to the display section 27 (Step S64). The display section 27 displays the content acquisition failure in response to the instruction sent from the control section 30. Then, a processing section is ended (END).

When it is decided that the current time obtained by the timer section 29 does not expire the validity term added to the content at the Step S47 (Step S47: N), the control section 30 fetches the content previously acquired by the cache section 28 and gives the display section 27 an instruction to display the content (Step S65). The display section 27 displays the content in response to the instruction sent from the control section 30. Then, a processing section is ended (END).

When the final update date is not added to the content stored in the cache section 28 at the Step S48 (Step S48: N), the control section 30 gives the external input/output section 26 an instruction for transmitting a content acquisition request on condition that the content stored in the cache section 28 is updated after the validity term added to the content stored in the cache section 28 (Step S66). The content acquisition request is valid only when the content stored in the cache section 28 is updated after the validity term added to the content added to the cache section 28. The external input/output section 26 transmits such a content acquisition request in response to the instruction sent from the control section 30.

The external input/output section 26 monitors the normal receipt of the content data from the content server to be a content request destination through the network 19, and transfers the received content data to the control section 30 when detecting the normal receipt. When the control section 30 normally acquires the content data received by the external input/output section 26 (Step S67: Y), it updates the cache section 28 by using the acquired content (Step S68) and gives an instruction for displaying the received content to the display section 27 (Step S69). The display section 27 displays the received content in response to the instruction given from the control section 30. Then, a processing section is ended (END).

On the other hand, when the external input/output section 26 cannot receive the content data from the content server to be the acquisition request destination through the network 19 and the control section 30 cannot acquire the content data at the Step S67 (Step S67: N), the reason why the content cannot be acquired is analyzed. For example, a response sent from the content server is analyzed. For example, when the reason the content data cannot be acquired is that the content on the content server side is not updated after the validity term added to the content stored in the cache section 28 is acquired as a result of the analysis carried out according to the response from the content server, for example, (Step S70: Y), the control section 30 fetches the content previously acquired by the cache section 28 and gives the display section 27 an instruction to display the content (Step S71). The display section 27 displays the content according to the instruction sent from the control section 30. Then, a processing section is ended (END).

When the content data cannot be acquired for any reason except that the content on the content server side is not updated after the validity term added to the content stored in the cache section 28 are acquired as a result of the analysis carried out according to the response sent from the content server, for example, at the Step S70 (Step S70: N), the control section 30 deletes the content stored in the cache section 28 (Step S72) and gives an instruction for displaying content acquisition failure to the display section 27 (Step S73). The display section 27 displays the content acquisition failure in response to the instruction sent from the control section 30. Then, a processing section is ended (END).

FIG. 20 represents a main part of the processing content of the update processing of the cache section shown in FIGS. 16, 17 and 19. The cache section 28 has a cache control section for controlling the whole cache section 28 and carries out the following processing to update the cache section 28. When the cache control section in the cache section 28 is to store content in the cache section 28 in response to an instruction sent from the control section 30, it first retrieves that the same content is stored in the cache section 28 or not (Step S80). When the cache control section detects that the same content is stored in the cache section 28 (Step S80: Y), it deletes the same content stored in the cache section 28 (Step S81) and carries out the rotation of the content (Step S82).

On the other hand, when the cache control section detects that the same content is not stored in the cache section 28 at the Step S80 (Step S80: N), it is decided whether the content is stored in all entries of the cache section 28 (Step S83). When it is decided that the content is stored in all entries (Step S83: Y), the cache control section deletes content on the head of the cache section 28 (Step S84) and carries out the rotation of the content (Step S85).

After the rotation of the cache section 28 is carried out at the Steps S82 and S85 or it is decided that the content is not stored in all the entries of the cache section 28 at the Step S83 (Step S83: N), the cache control section adds the content requested to be stored by the control section 30 to the end of the cache section 28 (Step S86).

In this case, the cache control section decides whether or not a validity term is added to the content requested to be stored by the control section 30 (Step S87). When it is decided that the validity term is added to the content requested to be stored by the control section 30, the cache control section (Step S87: Y), the cache control section adds the validity term to the content finally stored in the cache section 28 (Step S88). On the other hand, when the cache control section decides that the validity term is not added to the content requested to be stored by the control section 30 at the Step S87 (Step S87: N), "no validity term" is added to the content finally stored in the cache section 28 (Step S89).

Next, the cache control section decides whether or not a final update date is added to the content requested to be stored by the control section 30 (Step S90). If it is decided that the final update date is added to the content requested to be stored by the control section 30 (Step S90: Y), the cache control section adds the final update date to the content finally stored in the cache section 28 (Step S91). On the other hand, when the cache control section decides that the final update date is not added to the content requested to be stored by the control section 30 at the Step S90 (Step S90: N), "no final update date" is added to the content finally stored in the cache section 28 (Step S92). Finally, the cache control section adds a current date timed by the timer section 29 as a content acquisition date to the content finally stored in the cache section 28 (Step S93) and a processing section is ended (END).

In such a conventional content acquiring device, the content server collectively manages the content data. Therefore, there has been a problem in that it is necessary to carry out an update query with respective update conditions for the content server as in the Step S49, the Step S57 or the Step S66 in order to update the content. Moreover, this is the case even if the content was updated within the validity term in the content acquiring device. On the other hand, even if the content is stored in the cache section 28 in the content acquiring device, the content data are displayed by using the content data in the cache section 28 without acquiring the content. Thus, there has been a problem in that a current version of the content data collectively managed on the content server cannot always be read.

SUMMARY OF THE INVENTION

It is an object of the present invention to provide a content acquiring device capable of minimizing to the extend possible acquisition requests for content data and of acquiring content data having a current version.

A first aspect of the present invention is directed to a content acquiring device comprising: (a) cache means for temporarily storing received content, (b) acquisition request accepting means for accepting an acquisition request for content, (c) cache deciding means for deciding whether or not the content requested by the acquisition request is stored in the cache means, (d) validity expiration setting means for setting a validity expiration as an update expiration of the content based on a validity term of the content when it is decided by the cache deciding means that the content is stored in the cache means, (e) acquisition request transmitting means for transmitting the acquisition request for the content when the content have past the validity expiration set by the validity expiration setting means, and (f) content receiving means for receiving content based on the acquisition request transmitted from the acquisition request transmitting means.

According to the first aspect of the present invention, in the content acquiring device comprising the cache means, it is decided whether or not the content requested to be acquired are stored in the cache means. If it is decided that the content requested to be acquired are stored, the acquisition request for the content requested to be acquired is transmitted when the content has past the validity expiration set based on the validity term of the stored content. Thus, desirable content is received.

A second aspect of the present invention is directed to the content acquiring device according to the first aspect of the present invention, further comprising validity term holding means for previously holding a validity term, and validity term addition deciding means for deciding whether or not the validity term is added to the content, when it is decided by the cache deciding means that the content are stored in the cache means, the validity expiration setting means serving to set the validity expiration based on a validity term held by the validity term holding means when it is decided by the validity term addition deciding means that the validity term is not added.

According to the second aspect of the present invention, when the validity term of the content stored in the cache means is not added, the validity expiration is set by using the validity term previously held.

A third aspect of the present invention is directed to a method of acquiring content comprising the steps of (a) accepting means for accepting an acquisition request for content, (b) deciding whether or not the content requested by the acquisition request accepted at the acquisition request accepting step are stored in a cache for temporarily storing received content, (c) setting a validity expiration as an update expiration of the content based on a validity term added to the content when it is decided at the cache deciding step that the content are stored in the cache, (d) transmitting the acquisition request for the content when the content are out of the validity expiration set at the validity expiration setting step, and (e) receiving content corresponding to the acquisition request transmitted at the acquisition request transmitting step.

According to the third aspect of the present invention, the content acquisition request is accepted at the acquisition request step and it is decided at the cache deciding step whether or not the content requested by the acquisition request accepted at the cache deciding step is stored in the cache. When it is decided that the same content is stored, the validity expiration is set based on the validity term added to the content stored in the cache at the validity expiration setting step. When the content is not within the set validity expiration at the present time, the content acquisition request is transmitted at the acquisition request transmitting step and corresponding content are received at the content receiving step.

A fourth aspect of the present invention is directed to the method of acquiring content according to the third aspect of the present invention, further comprising the step of deciding whether or not the validity term is added to the content when it is decided at the cache deciding step that the content are stored in the cache, the validity expiration setting step serving to set the validity expiration based on a previously held validity term when it is decided at the validity term addition deciding step that the validity term is not added.

According to the fourth aspect of the present invention, when it is decided at the cache deciding step that the content is stored in the cache, it is decided at the validity term addition deciding step whether or not the validity term is added to the content stored in the cache. When it is decided that the validity term is not added, the validity expiration is set based on the validity term previously held at the validity expiration setting step. Consequently, the optimum content acquisition request can also be carried out for the content received from an existing content server in accordance with a parameter of the validity term.

A fifth aspect of the present invention is directed to a content server comprising (a) content storing means for previously storing content, (b) acquisition request receiving means for receiving an acquisition request transmitted when the content are out of a validity expiration to be an update expiration of the content stored in a cache which are set based on a validity term of the content, and (c) content transmitting means for fetching the content requested by the acquisition request received by the acquisition request receiving means from the content storing means and for transmitting the content to a destination of the acquisition request.

According to the fifth aspect of the present invention, the transmitted acquisition request is received only when the content is not within the validity expiration set based on the validity term of the content stored in the cache, and corresponding content is fetched from prestored content in the content server and is transmitted to the destination of the acquisition request.

A sixth aspect of the present invention is directed to the content server according to the fifth aspect of the present invention, wherein the validity expiration is set based on a validity term previously held in the destination of the acquisition request when the validity term is not added to the content stored in the cache.

According to the sixth aspect of the present invention, when the validity term is not added to the content stored in the cache, the validity expiration is set based on the validity term previously held in the destination of the acquisition request. Consequently, it is not necessary to give a parameter of the validity term to all the content prestored on the content server side. Thus, existing equipment can be applied.

A seventh aspect of the present invention is directed to a content acquiring system comprising: (a) a content acquiring device for transmitting an acquisition request of content to be an acquisition request object prestored through a network when the content is out of a validity expiration to be an update expiration of the content set based on a validity term of the content and for receiving content corresponding thereto, and (b) a content server for reading content corresponding to an acquisition request transmitted from the content acquiring device from content in various fields which are prestored, and for transmitting the content corresponding to the acquisition request to the content acquiring device through the network.

According to the seventh aspect of the present invention, in the content acquiring device, the acquisition request of the content to be a prestored acquisition request object is transmitted through the network when the content is not within the validity expiration set based on the validity term of the content, the content corresponding to the acquisition request transmitted from the content acquiring device is read from the content in various fields prestored in the content server and is returned through the network. Consequently, a traffic on the network can be relieved and a large number of content acquisition requests can be processed.

An eighth aspect of the present invention is directed to the content acquiring system according to the seventh aspect of the present invention, wherein the validity expiration is set based on a predetermined validity term previously held when a validity term is not added to the content to be an acquisition object.

According to the eighth aspect of the present invention, the validity expiration is set based on a predetermined validity term previously held when a validity term is not added to the content to be an acquisition object. Consequently, an existing device can be applied to reduce an equipment investment and to minimize the acquisition request. Thus, it is possible to provide a comfortable content service for a user to request the content acquisition.

A ninth aspect of the present invention is directed to a content acquiring system comprising (a) a content acquiring device including cache means for temporarily storing received content, acquisition request accepting means for accepting an acquisition request for content, cache deciding means for deciding whether or not the content requested by the acquisition request are stored in the cache means, validity expiration setting means for setting a validity expiration as an update expiration of the content based on a validity term added to the content when it is decided by the cache deciding means that the content are stored in the cache means, acquisition request transmitting means for transmitting the acquisition request for the content when the content are out of the validity expiration set by the validity expiration setting means, and content receiving means for receiving content based on the acquisition request transmitted from the acquisition request transmitting means, and (b) a content server including content storing means for previously storing content, acquisition request receiving means for receiving an acquisition request transmitted from the acquisition request transmitting means, and content transmitting means for fetching the content requested by the acquisition request received by the acquisition request receiving means from the content storing means and for transmitting the content to the acquisition request.

According to the ninth aspect of the present invention, in the content acquiring device comprising the cache means, it is decided by the cache deciding meant whether or not the content to be an acquisition request object accepted by the acquisition request accepting means is stored in the cache means. When it is decided that the same content are stored in the cache means, the validity expiration is set based on the validity term added to the stored content by the validity expiration setting means, and the acquisition request of the content is transmitted to the content server only when the content are not within the validity expiration at the present time. The content server prestores the content, and fetches the content requested by the acquisition request from the content storing means and transmits the same content to the content acquiring device. The content acquiring device receives the content transmitted from the content server.

A tenth aspect of the present invention is directed to the content acquiring system according to the ninth aspect of the present invention, further comprising validity term holding means for previously holding a validity term, and validity term addition deciding means for deciding whether or not the validity term is added to the content when it is decided by the cache deciding means that the content is stored in the cache means, the validity expiration setting means serving to set the validity expiration based on a validity term held by the validity term holding means when it is decided by the validity term addition deciding means that the validity term is not added.

According to the tenth aspect of the present invention, when the validity term of the content stored in the cache mean is not added, the validity expiration is set by using the validity term previously held. Consequently, it is possible to minimize the acquisition request for the content data from the content acquiring device and to acquire the content data having a current version as much as possible irrespective of the presence of the addition of a parameter of the validity term to the content in the content acquiring system.

BRIEF DESCRIPTION OF THE DRAWINGS

FIG. 1 is a diagram showing the summary of a structure of a content acquiring system to which a content acquiring device is applied, FIG. 2 is a block diagram showing the schematic structure of the content acquiring device, FIG. 3 is a flow chart showing the whole summary of the processing content of a content acquisition processing to be carried out by the content acquiring device according to the present embodiment, FIG. 4 is a flow chart showing a part of the summary of the processing content of the content acquisition processing to be carried out by the content acquiring device according to the present embodiment in FIG. 3, FIG. 5 is a flow chart showing a part of the summary of the processing content of the content acquisition processing to be carried out by the content acquiring device according to the present embodiment in FIG. 3, FIG. 6 is a flow chart showing a part of the summary of the processing content of the content acquisition processing to be carried out by the content acquiring device according to the present embodiment in FIG. 3, FIG. 7 is a flow chart showing a part of the summary of the processing content of the content acquisition processing to be carried out by the content acquiring device according to the present embodiment in FIG. 3, FIG. 8 is a flow chart showing a first part of the summary of the processing content of an update processing of a cache section in the content acquiring device according to the present embodiment, FIG. 9 is a flow chart showing a second part of the summary of the processing content of an update processing of a cache section in the content acquiring device according to the present embodiment, FIG. 10 is a sequence diagram showing a data flow in each section when content data are successfully acquired from a content server if the cache section has no content in a content acquiring system to which the content acquiring device according to the present embodiment is applied, FIG. 11 is a sequence diagram showing a data flow in each section when the acquisition of content data from a content server has failed if the cache section has no content in a content acquiring system to which the content acquiring device according to the present embodiment is applied, FIG. 12 is a sequence diagram showing a data flow in each section when the content is present in the cache section and a current date is set within a validity term in the content acquiring system to which the content acquiring device according to the present embodiment is applied, FIG. 13 is a sequence diagram showing a data flow in each section when the content is present in the cache section, a current date is set out of the validity term and content data are successfully acquired from the content server in the content acquiring system to which the content acquiring device according to the present embodiment is applied, FIG. 14 is a sequence diagram showing a data flow in each section when the content is present in the cache section, a current date is set out of the validity term and the acquisition of the content data from the content server is failed in the content acquiring system to which the content acquiring device according to the present embodiment is applied, FIG. 15 is a flow chart showing the summary of processing content in a conventional content acquiring device, FIG. 16 is a flow chart showing the whole summary of the processing content of a content acquisition processing to be carried out by the conventional content acquiring device, FIG. 17 is a flow chart showing a part of the summary of the processing content of the content acquisition processing to be carried out by the conventional content acquiring device in FIG. 16, FIG. 18 is a flow chart showing a part of the summary of the processing content of the processing acquisition processing to be carried out by the conventional content acquiring device in FIG. 16, FIG. 19 is a flow chart showing a part of the summary of the processing content of the processing acquisition processing to be carried out by the conventional content acquiring device in FIG. 16, FIG. 20 is a flow chart showing a first part of the summary of the processing content of an update processing of a cache section in the conventional content acquiring device, and FIG. 21 is a flow chart showing a second part of the summary of the processing content of the update processing of the cache section in the conventional content acquiring device.

DETAILED DESCRIPTION OF THE PREFERRED EMBODIMENTS

An embodiment of the present invention will be described below.

FIG. 1 shows an example of the summary of the structure of a content acquiring system to which a content acquiring device according to the present embodiment is applied. As described above, the content acquiring system comprises a content acquiring device group 15 including a personal computer 10, a PDA 11, a laptop computer 13 having a mobile communication terminal 12 such as a PHS or a portable telephone connected as a communication interface apparatus, a portable telephone 14 having a browser function and the like, a content server group 17 including first to Nth content servers $16_1$ to $16_N$ for storing various content data in a variety of fields are connected through a network 18 including a public communication network or a leased line.

In each content acquiring device of the content acquiring device group according to the present embodiment, preconfirmation is carried out with the update of the content in the content acquiring device by using a validity term previously held in the device or a validity term added at the time of the content data acquisition from the content server group so that a content data acquisition request for the content server group can be minimized.

More specifically, the content acquiring device according to the present embodiment decides whether or not a content acquisition request is to be transmitted from a device user to the content acquisition request by using the validity term previously held in the device or the validity term added at the time of the content data acquisition from the content server group. Herein, it is decided whether or not the content requested to be acquired is stored in a cache section provided in the content acquiring device. If the content is not stored, a content acquisition request is transmitted to the content server. On the other hand, when the content requested to be acquired are stored in the cache section, it is decided whether or not the validity term of the content of the cache section or the validity term is set before a content acquisition request date and a content acquisition request is transmitted to the content server if the validity term is set before the acquisition request date.

When the content server receives the content acquisition request from the content acquiring device through the network, it fetches content data corresponding thereto and transmits the same content data to the content acquiring device. In the content acquiring device, if it is decided that the content acquisition request is to be transmitted from the device user to the content server, the content data received corresponding to the acquisition request transmitted to the content server are displayed on the display section. On the other hand, if it is decided that the content acquisition request does not need to be transmitted to the content server, the content data stored in the cache section in the content acquiring device are displayed on the display section without transmitting an acquisition request to the content server.

Each content acquiring device in the content acquiring device group 15 is constituted by each section shown in FIG. 2. More specifically, the content acquiring device according to the present embodiment comprises an input section for accepting various requests sent from a device user, an external input/output section having an interface function together with the network, a display section such as a liquid crystal display (LCD) for displaying content data acquired by the external input/output section, a cache section for temporarily storing the content data, a timer section for timing an update time of the content data stored in the cache section, and a control section for controlling each section of the device.

The control section has a central processing unit (CPU) which is not shown, and can execute the above mentioned various control operations in accordance with a control program stored in a predetermined storage device such as a read only memory (ROM) which is not shown.

Since the summary of the processing of the content acquiring device according to the present embodiment is the same as that in FIG. 15, description will be omitted. The content acquiring device according to the present embodiment has different processing content based on a content acquisition processing control program stored in a memory (not shown) in the control section therein.

The network and the content server are well known to the skilled in the art and the detailed description of the structure and operation will be omitted.

FIGS. 3 to 7 show the summary of processing content of a control program to be executed by the content acquiring device according to the present embodiment. The control section analyzes the request for content acquisition which is accepted by the input section 25 and gives an instruction of the content acquisition request to the display section. The display section displays the content acquisition request in accordance with the instruction sent from the control section. The control section specifies the requested content data, and retrieves the cache section to decide whether or not data from the requested content is present (Step S100). When it is decided that the content data requested to be acquired are not present in the cache section (Step S100: N), an instruction for transmitting a request for acquiring the content data is given to the external input/output section (Step S101). The external input/output section transmits a content acquisition request through the network to the content server.

The external input/output section monitors the normal receipt of the content data from the content server serving as a content request destination through the network, and transfers the received content data to the control section when detecting normal receipt. When the control section acquires the content data normally (Step S102: Y), it updates the cache section using the acquired content (Step S103) and gives an instruction for displaying the received content to the display section (Step S104). The display section displays the received content in response to the instruction given from the control section. Then, a processing section is ended (End).

On the other hand, when the external input/output section cannot receive the content data from the content server serving as the acquisition request destination through the network and the control section cannot acquire the content data (Step S102: N), the control section deletes the content stored in the cache section and gives the display section an instruction to display content acquisition failure (Step S105). For example, when the content data requested from the content server cannot be acquired within a specified time corresponding to the content acquisition request transmitted from the external input/output section or when the content data requested to be acquired in the content server cannot be found or there are no content data requested to be acquired, the above mentioned processing is carried out. At that time, the display section displays content acquisition failure in response to the instruction sent from the control section. Then, a processing section is ended (END).

When it is decided that the cache section has the content data required to be acquired at the Step S100 (Step S100: Y), the control section decides whether or not a validity term has been added to the content data requested which are stored in the cache section (Step S106). The validity term would have been added at the time w the content was acquired from the content server. When it is decided that the validity term has been added to the content data requested which are stored in the cache section (Step S106: Y), the validity term is compared with the validity term previously held in the content acquiring device (Step S107). When the validity term of the content data in the cache section is smaller than the validity term held in the device (Step S107: Y), the control section makes the validity term of the content data in the cache section valid (Step S108). When the validity term of the content data in the cache section is equal to or more than the validity term held in the device (Step S107: N), the validity term previously held in the content acquiring device is made valid (Step S109).

Moreover, when it is decided that the validity term was not added to the content data requested which are stored in the cache section at the Step S106 (Step S106: N), the validity term previously held in the content acquiring device is made valid (Step S109).

After the validity term of the content in the cache section or the validity term previously held in the content acquiring device is made valid at the Steps S108 and S109, it is decided whether or not the validity term is added to the content data requested to be acquired which are stored in the cache section (Step S110). The validity term was previously added by the content server or added during acquisition from the content server, for example. When it is decided that the validity term is added to the content stored in the cache section (Step S110: Y), the control section decides whether or not a final update date is added to the content stored in the cache section (Step S111). The final update date is added during the acquisition of the content. When it is decided that the final update date is added to the content stored in the cache section (Step S111: Y), the validity term made valid at the Step S108 or S109 is added to the final update date of the content stored in the cache section and a "final update validity date" expressed in Equation (1) is calculated.

$$(\text{Final update validity date})=(\text{final update date})+(\text{validity term}) \quad (1)$$

Subsequently, the control section compares the final update validity date thus calculated with a content acquisition date of the content stored in the cache section (Step S112). When the final update validity date is smaller than the content acquisition date of the content stored in the cache section (Step S112: Y), the control section compares the validity term of the content stored in the cache section with the final update validity date thus calculated (Step S113). When the validity term of the content stored in the cache section is smaller than the final update validity date (Step S113: Y), the control section makes the validity term of the content stored in the cache section valid (Step S114). When the validity term of the content stored in the cache section is equal to or greater than the final update validity date at the Step S113 (Step S113: N), the control section sets the calculated final update validity date to be a validity term (Step S115).

When the final update validity date is equal to or greater than the content acquisition date of the content stored in the cache section (Step S112: N), the control section adds the validity term made valid at the Step S108 or the Step S109 to the content acquisition date of the content stored in the cache section and a "content acquisition validity date" expressed in Equation (2) is calculated.

$$(\text{Content acquisition validity date})=(\text{content acquisition date})+(\text{validity term}) \quad (2)$$

Subsequently, the control section compares the content acquisition validity date thus calculated with the validity term of the content stored in the cache section (Step S116). When the validity term of the content stored in the cache section is smaller than the content acquisition validity date (step S116: Y), the control section makes the validity term of the content stored in the cache section valid (Step S117). When the validity term of the content stored in the cache section is equal to or greater than the content acquisition validity date (Step S116: N), the control section makes the calculated content acquisition validity date valid (Step S118).

When it is decided that the validity term is not added to the content stored in the cache section at the Step S110 (Step S110: N), the control section decides whether or not the final update date is added to the content stored in the cache section (Step S119). When it is decided that the final update date is added to the content stored in the cache section (Step S119: Y), the control section compares the content acquisition validity date calculated in the same manner as in the Equation (2) with the final update validity date calculated in the same manner as in the Equation (1) (Step S120). When the content acquisition validity date is smaller than the final update validity date (Step S120: Y), the control section makes valid the content acquisition validity date obtained as a validity expiration by adding the validity term valid for the content acquisition date of the content stored in the cache section (Step S121). When the content acquisition validity date is equal to or greater than the final update validity date (Step S120: N), the control section makes valid the final update validity date obtained as a validity expiration by adding the validity term valid for the final update date of the content stored in the cache section (Step S122).

On the other hand, it is decided that the final update date is not added to the content stored in the cache section at the Step S119 (Step S119: N), the control section makes valid the content acquisition validity date obtained as a validity expiration by adding the validity term valid for the content acquisition date stored in the cache section (Step S123).

At the Step S111, moreover, it is decided that the final update is not added to the content stored in the cache section (Step S111: N), the control section compares the validity expiration of the content stored in the cache section with the content acquisition validity date calculated in the same manner as in the Equation (2) (Step S124). When the validity expiration of the content stored in the cache section is smaller than the calculated content acquisition validity date (Step S124: Y), the control section makes the validity expiration stored in the cache section valid (Step S126). When the validity expiration of the content stored in the cache section is equal to or greater than the calculated content acquisition validity date (Step S124: N), the control section makes the calculated content acquisition validity date valid as a validity expiration (Step S126).

When the validity expiration is set at any of the Steps S114, S115, S117, S118, S121 to S123, S125 and S126, the control section decides whether or not a current date timed by the timer section in the device passes the validity expiration added to the content (Step S127). When it is decided that the current time obtained by the timer section is out of the validity expiration added to the content (Step S127: N), the control section gives an instruction for transmitting a content acquisition request to the external input/output section (Step S128). The external input/output section transmits the content acquisition request to the content server through the network in response to the instruction sent from the control section.

The external input/output section monitors the normal receipt of the content data from the content server to be a content request destination through the network, and transfers the received content data to the control section when detecting the normal receipt. When the control section acquires the content data normally received by the external input/output section (Step S129: Y), it updates the cache section only if the acquired content is updated (Step S130: Y, Step S131) and gives an instruction for displaying the received content to the display section (Step S132). The display section displays the received content in response to the instruction given from the control section. When the acquired content is not updated, the cache section is not updated (Step S130: N, Step S131) and exactly gives an instruction for displaying the received content to the display section (Step S132). Then, a processing section is ended (END).

When the external input/output section cannot receive the content data from the content server to be an acquisition request destination through the network and the control section cannot acquire the content data at the Step S129 (Step S129: N), the control section deletes the content stored in the cache section (Step S133) and gives an instruction for displaying a content acquisition failure to the display section (Step S134). This operation is carried out when the content data requested from the content server for a constant time cannot be acquired corresponding to the content acquisition request transmitted from the external input/output section, for example, or when the content data requested to be acquired in the content server cannot be found or there are no content data requested to be acquired. At that time, the display section displays indication of a content acquisition failure in response to the instruction sent from the control section. Then, a processing section is ended (END).

When it is decided that the current time obtained by the timer section does not expire the validity term added to the content at the Step S127 (Step S127: Y), the control section fetches the content from the cache section 28 (Step S135) and gives an instruction for transmitting a content acquisition request to the display section (Step S136). The display section displays the fetched content in response to the instruction sent from the control section. Then, a processing section is ended (END).

FIG. 8 represents a main part of the processing content of the update processing of the cache section shown in FIGS. 3 and 7. The cache section has a cache control section for controlling the whole cache section and carries out the following processing to update the cache section. When the cache control section in the cache section is to store content in the cache section in response to an instruction sent from the control section, it first retrieves that the same content is stored in the cache section or not (Step S140). When the cache control section detects that the same content are stored in the cache section (Step S140: Y), it deletes the same content stored in the cache section (Step S141) and carries out the rotation of the content (Step S142). The rotation serves to change the arrangement of the content stored in the cache section in order of acquisition, and the content stored finally in the cache section is the most newly acquired content on a time basis.

On the other hand, when the cache control section detects that the same content is not stored in the cache section at the Step S140 (Step S140: N), it is decided whether the content is stored in all entries of the cache section (Step S143). When it is decided that the content is stored in all entries (Step S143: Y), the cache control section deletes content on the head of the cache section (Step S144) and carries out the rotation of the content (Step S145).

After the rotation of the cache section is carried out at the Steps S142 and S145 or it is decided that the content is not stored in all the entries of the cache section at the Step S143 (Step S143: N), the cache control section adds the content requested to be stored by the control section to the end of the cache section (Step S146).

In this case, the cache control section decides whether or not a validity term is added when the content requested to be stored by the control section are acquired (Step S147). When it is decided that the validity term is added (Step S147: Y), the cache control section adds the validity term added to the content requested to be stored by the control section to the content stored finally in the cache section (Step S148). On the other hand, when the control section decides that the validity term is not added to the content requested to be stored by the control section at the Step S147 (Step S147: N), the cache control section adds "no validity term" to the content stored finally in the cache section 28 (Step S149).

Next, the cache control section decides whether or not a validity expiration is added when the content requested to be stored by the control section are acquired (Step S150). When it is decided that the validity expiration is added (Step S150: Y), the cache control section adds the validity expiration added to the content requested to be stored by the control section to the content stored finally in the cache section (Step S151). On the other hand, when the control section decides that the validity expiration is not added to the content requested to be stored by the control section at the Step S150 (Step S150: N), the cache control section adds "no validity expiration" to the content stored finally in the cache section (Step S152).

Then, the cache control section decides whether or not a final update date is added to the content when the content requested to be stored by the control section are acquired (Step S153). When it is decided that the final update date is added to the content requested to be stored by the control section (Step S153: Y), the cache control section adds the final update date to the content stored finally in the cache section (Step S154). On the other hand, when the control section decides that the final update date is not added to the content requested to be stored by the control section at the Step S153 (Step S153: N), the cache control section adds "no final update date" to the content stored finally in the cache section (Step S155). Finally, the cache control section adds the current date timed by the timer section as the content acquisition date to the content stored finally in the cache section (step S156), and a processing section is ended (End).

Next, the operation of the content acquiring device according to the present embodiment will be described specifically.

FIG. 10 shows a data flow in each section in the case in which content is not present in the cache section and the acquisition of the content data from the content server is successful in a content acquiring system to which the content acquiring device according to the present embodiment is applied. More specifically, when an acquisition request 160 is given from the user of the content acquiring device through the input section, information indicative of the acquisition request is sent to the control section (acquisition request notice 161). The control section analyses the indication information and gives an instruction for display to the display section when the result of the analysis is the content acquisition request (acquisition notice 162). The control section retrieves the cache section based on the analyzed content acquisition request (retrieval 163). Assuming that there are not content in the cache section, the control section receiving a "no content" 164 as the result of the retrieval of the cache section, gives an instruction for a transmission 165 of the content acquisition request to the external input/output section. The external input/output section transmits a content acquisition request 166 to the content server, and monitors the receipt of content data 167 requested to be acquired.

When receiving the content data requested to be acquired, the external input/output section gives a notice to the control section as received content data 168. The control section adds a validity term, a validity expiration, a final update date and a content acquisition date to the received content as shown in FIGS. 8 and 9 and gives an instruction for storage to the cache section (storage 169), and gives the display section an instruction for displaying the received content data (display 170).

FIG. 11 shows a data flow in each section in the case in which content is not present in the cache section and the acquisition of the content data from the content server is fails in the content acquiring system to which the content acquiring device according to the present embodiment is applied. The same data as those in the case in which the content data acquisition is successful as shown in FIG. 10 have the same reference numerals and description thereof will be omitted. More specifically, after the content acquisition request 166 is transmitted to the content server by the external input/output section based on the acquisition request 160 input from the user of the content acquiring device through the input section, the receipt of the content data 167 requested to be acquired is monitored.

When the content data requested from the content server cannot be acquired for a specified time corresponding to the transmitted content acquisition request or the content data requested to be acquired cannot be found or are not present in the content server, for example, the external input/output section gives an instruction for a content acquisition failure display 177 to the display section as described in the Step S105 shown in FIG. 3 if a message of the content acquisition failure is given as a content acquisition failure notice 176 to the control section based on a content acquisition failure message 175 given from the content server.

FIG. 12 shows a data flow in each section in the case in which the content is present in the cache section and the current date is within the validity term in the content acquiring system to which the content acquiring device according to the present embodiment is applied. The same data as those in the case in which the content data acquisition is successful as shown in FIG. 10 have the same reference numerals and description thereof will be omitted. More specifically, the cache retrieval 163 is transmitted to the cache section based on the acquisition request 160 input from the user of the content acquiring device through the input section and a notice 180 indicative of the presence of the content is received correspondingly. After a validity term and a validity expiration are set as shown in FIGS. 3 to 6, an instruction for a content fetch 181 is given to the cache section as described in the Step S135 shown in FIG. 7 when it is decided that the current date is within the validity term. When the content corresponding to the content fetch request are received from the cache section (contents receipt 182), an instruction for a display 183 for the content data received is given to the display section.

FIG. 13 shows a data flow in each section in the case in which content is present in the cache section, the current date is out of the validity term and the content data acquisition from the content server is successful in the content acquiring system to which the content acquiring device according to the present embodiment is applied. The same data as those in the case in which the content data acquisition is successful as shown in FIG. 10 have the same reference numerals and description thereof will be omitted. More specifically, the cache retrieval 163 is transmitted to the cache section based on the acquisition request 160 input from the user of the content acquiring device through the input section and a notice 185 indicative of the presence of the content is received correspondingly. After a validity term and a validity expiration are set as shown in FIGS. 3 to 6, an instruction for a content acquisition request transmission 186 is first given to the external input/output section as described in the Steps S128 to S132 shown in FIG. 7 when it is decided that the current date is out of the validity term. The external input/output section transmits a content acquisition request 187 through the network and monitors the receipt of the content data requested to be acquired.

When receiving the content data 188 requested to be acquired, the external input/output section gives a notice to the control section as received content data 189. If the received content is updated in the content server, the control section adds a validity term, a validity expiration, a final update date and a content acquisition date to the cache section as shown in FIGS. 8 and 9, carries out an update 190 of the cache section and gives the display section an instruction for display of the received content data (display 191).

FIG. 14 shows a data flow in each section in the case in which content are present in the cache section, the current date is out of the validity term and the acquisition of the content data from the content server fails in the content acquiring system to which the content acquiring device according to the present embodiment is applied. The same data as those in the case in which the content data acquisition is successful as shown in FIG. 13 have the same reference numerals and description thereof will be omitted. More specifically, after the notice 185 indicative of the presence of the content is received corresponding to the cache retrieval 163 transmitted to the cache section and a validity term and a validity expiration are set as shown in FIGS. 3 to 6 based on the acquisition request 160 input from the user of the content acquiring device through the input section, the instruction for the content acquisition request transmission 186 is first given to the external input/output section as described in the Steps S128 to S132 shown in FIG. 7 when it is decided that the current date is out of the validity term. The external input/output section transmits the content acquisition request 187 through the network and monitors the receipt of the content data requested to be acquired.

When the content data requested from the content server cannot be acquired for a specified time corresponding to the transmitted content acquisition request or the content data requested to be acquired cannot be found or are not present in the content server, for example, the external input/output section transmits a corresponding content deleting instruction 197 to the cache section and gives an instruction for a content acquisition failure display 198 to the display section as described in the Step S133 shown in FIG. 7 if a message of the content acquisition failure is given as a content acquisition failure notice 196 to the control section based on a content acquisition failure message 195 given from the content server.

In the content acquiring device according to the present embodiment, thus, a validity term parameter of the content is provided, the validity term is newly used to previously decide in the device whether or not the content is to be updated, and an acquisition request to be an access to the content server storing the content data requested to be acquired through the network is then transmitted. Consequently, in the case in which the content requested to be acquired is particularly present in the cache section, the access to the content server can be suppressed based on the validity term of the content and an access time required for the use of the content in the cache section can be reduced. Correspondingly, an unnecessary load is not applied to the network and a throughput in the network can be enhanced. Moreover, the validity term parameter is provided in the content acquiring device itself. Consequently, even if the validity term is not added when the content data stored in the content server are acquired, it can be previously decided in the device whether or not the content is to be updated based on the validity term previously held in the device. Thus, the present invention can be applied to the conventional content acquiring system.

Although there has been described the content acquiring device according to the present embodiment which serves to decide based on the "day" whether the content is to be updated or not, this is not restricted. For example, the decision may be carried out based on a "date".

According to the first or third aspect of the present invention, as described above, in the case in which the content requested to be acquired are in the cache section, an access to the content server can be controlled based on the validity term of the content, and an access time required for using the content in the cache section can be reduced. Correspondingly, an unnecessary load is not applied to the network and a throughput in the network can be enhanced.

According to the second or fourth aspect of the present invention, furthermore, the parameter of the validity term is provided in the content acquiring device itself. Consequently, even if the validity term is not added when the content data stored in the content server are acquired, it can be previously decided in the device whether or not the content is to be updated based on the validity term previously held in the device. Thus, the present invention can be applied to a conventional content acquiring system.

According to the fifth aspect of the present invention, it is sufficient that the content are fetched and returned for the acquisition request transmitted only when the content are not within the validity expiration set based on the validity term of the content stored in the cache. Therefore, a processing load in the content server can also be reduced considerably. Thus, it is possible to provide a comfortable content service for the user.

According to the sixth aspect of the present invention, furthermore, when the validity term is not added to the content stored in the cache, the validity expiration is set based on the validity term previously held in the destination of the acquisition request. Consequently, it is not necessary to give the validity term parameter to all the content previously stored on the content server side, and existing equipment can be applied.

According to the seventh to tenth aspects of the present invention, traffic on the network can be relieved and a large number of content acquisition requests can be processed. According to the eighth or tenth aspect of the present invention, particularly, when the validity term is not set to the content to be an acquisition object, the validity expiration is set based on a predetermined validity term previously held. Consequently, an existing device is applied to reduce an equipment investment and the acquisition request can be minimized. Thus, it is possible to provide a comfortable content service for the user to request the content acquisition.

What is claimed is:

1. A content acquiring device comprising:
 cache means for temporarily storing received content:
 acquisition request accepting means for accepting an acquisition request for content;
 cache deciding means for deciding whether or not the content requested by the acquisition request is stored in the cache means;
 validity expiration setting means for setting a validity expiration as an update expiration of the content based on a validity term of the content, when it is decided by the cache deciding means that the content is stored in the cache means;

acquisition request transmitting means for transmitting the acquisition request for the content, when the content is past the validity expiration set by the validity expiration setting means;

content receiving means for receiving content based on the acquisition request transmitted from the acquisition request transmitting means, wherein if a control section determines that the content is received normally by the content receiving means, the control section updates with the content received the cache means; and further comprising validity term holding means for holding a previously held validity term, and validity term addition deciding means for deciding whether or not the validity term is associated with the content, when it is decided by the cache deciding means that the content is stored in the cache means, the validity expiration setting means serving to set the validity expiration based on the previously held validity term held by the validity term holding means when it is decided by the validity term addition deciding means that the validity term was not associated, wherein when the content requested to be acquired from the content server does not exist or cannot be found, the control section deletes the corresponding content stored in the cache section.

2. A method of acquiring content comprising the steps of:

accepting an acquisition request for content;

deciding whether or not the content requested by the acquisition request accepted at the acquisition request accepting step is stored in a cache for temporarily storing received content;

setting a validity expiration as an update expiration of the content based on a validity term added to the content when it is decided at the deciding step that the content is stored in the cache;

transmitting the acquisition request for the content when the content has passed the validity expiration set at the validity expiration setting step;

receiving content corresponding to the acquisition request transmitted at the acquisition request transmitting step, wherein if a control section determines that the content is received normally by the content receiving means, the control section updates with the content received the cache; and further comprising the step of deciding whether or not the validity term is associated with the content when it is decided at the cache deciding step that the content is stored in the cache, the validity expiration setting step serving to set the validity expiration based on a previously held validity term when it is decided at the validity term addition deciding step that the validity term is not associated, wherein when the content requested to be acquired from the content server does not exist or cannot be found, the control section deletes the corresponding content stored in the cache.

3. A content server comprising:

content storing means for previously storing content;

acquisition request receiving means for receiving an acquisition request transmitted when the content has passed a validity expiration serving as an update expiration of the content stored in a cache, which validity expiration is set based on a validity term of the content; and content transmitting means for fetching the content requested by the acquisition request received by the acquisition request receiving means from the content storing means and for transmitting the content to a destination of the acquisition request, wherein if a control section determines that the content is received normally by the content receiving means, the control section updates with the content received the cache, wherein the validity expiration is set based on a previously held validity term in destination of the acquisition request when the validity term is not associated with the content stored in the cache, wherein when the content requested to be acquired from the content server does not exist or cannot be found, the control section deletes the corresponding content stored in the cache.

4. A content acquiring system comprising:

a content acquiring device for transmitting via a network an acquisition request for content that is an acquisition request object prestored when the content has passed a validity expiration serving as an update expiration of the content set based on a validity term of the content, and for receiving content corresponding thereto; and a content server for reading content corresponding to an acquisition request transmitted from the content acquiring device from content in various fields which are prestored, and for transmitting via the network the content corresponding to the acquisition request to the content acquiring device, wherein if a control section determines that the content is received normally by the content receiving means, the control section updates with the content received a cache, wherein the validity expiration is set based on a predetermined validity term previously held, when a validity term is not added to the content that is the acquisition request object, wherein when the content requested to be acquired from the content server does not exist or cannot be found, the control section deletes the corresponding content stored in the cache.

5. A content acquiring system comprising:

a content acquiring device including cache means for temporarily storing received content, acquisition request accepting means for accepting an acquisition request for content, cache deciding means for deciding whether or not the content requested by the acquisition request is stored in the cache means, validity expiration setting means for setting a validity expiration as an update expiration of the content based on a validity term added to the content when it is decided by the cache deciding means that the content is stored in the cache means, acquisition request transmitting means for transmitting the acquisition request for the content when the content have passed the validity expiration set by the validity expiration setting means, and content receiving means for receiving content based on the acquisition request transmitted from the acquisition request transmitting means;

a content server including content storing means for previously storing content, acquisition request receiving means for receiving an acquisition request transmitted from the acquisition request transmitting means, and content transmitting means for fetching the content requested by the acquisition request received by the acquisition request receiving means from the content storing means, and for transmitting the content to the content acquiring device, wherein if a control section determines that the content is received normally by the content receiving means, the control section updates with the content received the cache means; and further comprising validity term holding means for previously holding a validity term, and validity term addition deciding means for deciding whether or not the validity term is associated with the content, when it is decided by the cache deciding means that the content is stored in the cache means, the validity expiration setting means serving to set the validity expiration based on a held validity term of the validity term holding means when it is decided by the validity term addition deciding means that the validity term is not associated, wherein when the content requested to be acquired from the content server does not exist or cannot be found, the control section deletes the corresponding content stored in the cache means.

* * * * *